OR  3,958,864

United States
Glatzel

[11] 3,958,864
[45] May 25, 1976

[54] HIGH POWER PHOTOGRAPHIC OBJECTIVE WITH LARGE ANGULAR FIELD

[75] Inventor: Erhard Glatzel, Heidenheim, Brenz, Germany

[73] Assignee: Carl Zeiss Stiftung, Oberkochen, Germany

[22] Filed: Nov. 25, 1974

[21] Appl. No.: 527,090

[30] Foreign Application Priority Data
Nov. 28, 1973  Germany............................ 2359156
July 29, 1974  Germany............................ 2436144

[52] U.S. Cl. ............................... 350/189; 350/176; 350/207; 350/214
[51] Int. Cl.² ....................... G02B 3/04; G02B 9/64
[58] Field of Search ............ 350/214, 207, 176, 189

[56] References Cited
UNITED STATES PATENTS
3,870,402  3/1975  Takahashi...................... 350/176 X FOREIGN PATENTS OR APPLICATIONS
83,412  6/1964  France................................ 350/214

Primary Examiner—Paul A. Sacher
Attorney, Agent, or Firm—Stonebraker, Shepard & Stephens

[57] ABSTRACT

A high power lens for photograhic purposes, having a relatively large angular field. The lens has at least seven air spaced members, at least three of which are behind a central vertex space, those members in front of such space being divided into two groups of at least two members in each group, the front member in each of these two groups having both its front surface and its rear surface convex toward the front or object side. In the rear group behind the central vertex space, there is a negative member followed by two positive or collecting members, the first such positive member being separated from the negative member by an air lens of diverging action. Specific conditional data are given for several examples or embodiments of the invention.

31 Claims, 15 Drawing Figures

HIGH POWER PHOTOGRAPHIC OBJECTIVE WITH LARGE ANGULAR FIELD

BACKGROUND OF THE INVENTION

This invention relates to a high speed lens system or objective suitable for photographic purposes, and having a relatively large angular field of view. Photographic lenses of many types are, of course, well known in the art, and a lens similar in some respects to the present invention is disclosed in German Pat. No. 1,250,153, issued Mar. 21, 1968 to the Carl Zeiss firm for an invention of the present applicant. The present invention relates to a lens which is considerably improved as compared with the lens of the above mentioned patent, giving better image quality.

DESCRIPTION OF THE PREFERRED EMBODIMENTS

Figure 1:
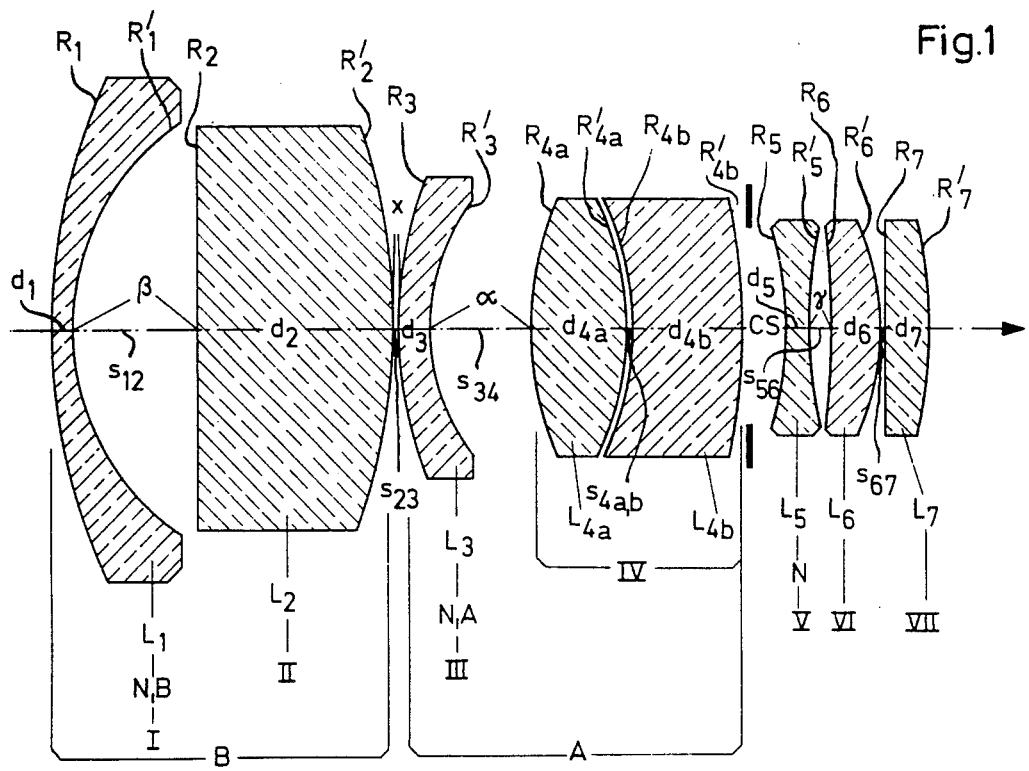
FIG. 1 is a schematic diagram illustrating a lens system in accordance with one embodiment of the invention.

According to the present invention, the objective or lens system (for brevity frequently referred to herein merely as a "lens") comprises at least seven individual air spaced members, at least three of which are behind the inner central vertex space or distance illustrated in the drawings at CS, which space may contain but does not necessarily contain a stop or diaphragm, preferably of variable aperture if a diaphragm is used. The members behind the central vertex space comprise a negative element or component indicated in the drawings by N of diverging action, followed by a first collecting or positive member or element separated from the negative element by an air space of diverging action, and then a second positive member or element behind the first positive element and separated from it by an air space of collecting action, both of these two collecting members having rear surfaces which are concave toward the front, that is, toward the object space.

In front of the above mentioned central vertex space CS, in the direction toward the object or longer conjugate, there are two assemblies or groups of lenses, the rear one of which (in front of the space CS) is designated in general by the reference character A, and the front one of which is designated in general by the reference character B. Each of these members or groups A and B comprises a meniscus-shaped lens element convex toward the front, followed by a collecting or positive lens air spaced from the meniscus. The air space between the meniscus and the following positive lens in group A is designated as $\alpha$, and the air space between the meniscus and the following positive lens in the front group B is designated as $\beta$. The meniscus lenses in these two groups A and B are respectively designated as N, A and N, B, both being of negative or diverging power. According to one feature of the invention, the axial thicknesses of each of the two air spaces $\alpha$ and $\beta$ is within the limits of 0.10 F and 0.80 F, and the sum of these two air spaces is within the limits of 0.25 F and 1.30 F, wherein F stands for the equivalent focal length of the entire lens system or objective.

The objective of the present invention thus constitutes a substantial further development of the design rules disclosed in the above mentioned German Pat. No. 1,250,153, namely in the manner that, as a result of the new principle of construction, a further increase in the overall performance of the objective is for the first time opened up for this further development, both with respect to the useful relative aperture, and also simultaneously with respect to a particularly greatly refined image-forming performance over its wide-angle field of view.

The inventive concept proceeds from the consideration that increased image-forming performance, with simultaneous increase of the usable cross section of the beam of rays over a large field angle, can be used for the successful solution of the problem at hand by introducing a suitable reduction of the zonal intermediate aberrations (aberrations of higher order) both in the central and in the lateral image field in such an image-forming process by means of a wide-open beam, and specifically in a manner which is capable of being technically realized.

In order to assure this possibility of realization, the present invention for the first time opens up a new path of realizing the desired solution of the problem in connection with the present type of objective, in accordance with the construction rules set forth in the claims. This specific increase in the definition of image goes simultaneously hand in hand with the introduction of relatively weakly refracting and at the same time extensively relaxed optical elements in the front member of the objective, facing the longer conjugate or object. In this way, the result is obtained that the rays which enter without aberration into the front of the lens, from the remote object, are subjected on their way to the location of the stop or diaphragm to only the smallest possible aberrations of higher order, by the front member optical elements, which at the same time are so strongly released in their surface sensitivity that the advance in the art which can be obtained through the entire dioptric surface utilization of these optical elements which are particularly large in the case of high-power wide-angle systems, is practically fully realizable in actual fact, because due to this relaxation, relatively small differences in tolerance upon the manufacture of the system cannot serve to endanger the attainment of the advance in the art. Rather, within the scope of the known tolerance ranges customary in the art, the advance in the art and the practical utility thereof are firmly interrelated and thus can be utilized in actual practice.

This approach taken by the present invention is to be contrasted with the older proposals of the prior art where, for example, there is introduced a strongly curved and accordingly extremely strained pair of cemented surfaces having a relatively small difference in indices of refraction, as for instance proposed in German Pat. No. 349,938 (Zeiss, 1922), and in the paper of W. Merte, entitled "Ueber die Kaustik axialer Dingpunkte," published in 1925 in the Zeitschrift fur physik, volume 33, pages 533 and following.

In accordance with one aspect of the present invention, it is found that the above mentioned beneficial results can be attained in a lens of this general type, if in addition to having the air spacings $\alpha$ and $\beta$ within the limits above mentioned, the construction also complies with both of the following two rules of construction.

First, the sum of the surface powers $\phi_x$ of the two lens surfaces limiting the air lens $x$ in the space $s_{23}$ between the two front-member assemblies or groups B and A, on the one hand, and the sum of the surface powers $\phi_s$ of the two negative meniscus components N-B and N-A in these two front member assemblies, on the other hand, are so dimensioned that the quotient $Q_a$ of said air lens power $\phi_x$ divided by the said sum of the surface powers $\phi_s$ has a negative value within the limits of −0.708 and −1.713.

Second, the above mentioned sum of the surface powers $\phi_x$ of the collecting air lens ($x$) also has such a balanced distribution of power of refraction with respect to the lens power $\phi_I$ of the negative meniscus (N, B also designated as I) adjacent the longer conjugate or object side, that the negative value of the quotient $Q_b$ of this air lens power $\phi_x$ divided by the paraxial surface power sum $\phi_I$ of the meniscus-shaped negative component I is within the limits of 1.533 and 3.123.

These two constructional rules may be written as formulas as follows:

$$0.708 < -Q_a < 1.713 \qquad (a)$$

$$1.533 < -Q_b < 3.123 \qquad (b)$$

In these formulas, $Q_a = \phi_x - \phi_S$ and $-\phi_S = \phi_{N,B} + \phi_{N,A}$. The negative sign in these design rules means that the air lens power has a sign which is opposite to the lens powers of the negative part or parts (I or the corresponding sum of I and III).

The way toward the extremely surprising and important increase in power for the present type of wide angle objective, is opened up for the first time when one recognizes and utilizes these two constructional rules or partial features of the invention numerically precisely described above, and summarized in the two formulas (a) and (b). The optical effect of these deisgn rules can after their disclosure be clearly understood by the optical designer if, upon the analysis of the dioptric effect for the present invention, it is borne in mind that as a result of these two negative parts (N, B and N, A) which are located on the side of the longer conjugate, the rays which enter the system without aberration from the remote object are imparted both a strong over-correction of primary type and at the same time an accumulation of the aberrations of higher order, which so greatly impair the best possible picture definition.

These injurious consequences of over-correction which are inherent in the action of the negative parts are counteracted, in accordance with the first rule (formula a) in the manner that between the two optical groups B and A there is interposed a strongly collecting air lens power $\phi_x$ which is definitely greater than the square root of half ( $\sqrt{0.5} = 0.7071$ ) of the sum (of the surface powers $\phi_S$ of the two negative components N, B + N, A) on the entrance side of the beams into the entire objective. A substantial part of the range of position of this feature (formula a) indicates that $\phi_x$ can even be considerably greater than the sum of the surface powers of the two meniscus negative parts, whereby the way is opened up by the upper position range to an overcompensating reversal from diverging to collecting combined effect.

The other constructional rule, summarized in formula (b), makes available a corresponding action with special reference to the reduction of aberrations of higher order for the strongly inclined lateral picture rays, with simultaneous opening up of a particularly simple compensation effect on the distortion errors, in which connection the reduction of the aberrations of higher order in the wide-open lateral beam cross sections is of particular importance, especially for high speed wide angle lenses with their high relative apertures and accordingly particularly large diameters of the beam cross section, while the upper limits of this rule or feature (b) are directed at assuring a long back focus.

Within the scope of the present principles of construction of the invention, it is furthermore possible, in known manner, to breakdown one or more of the optical parts of the objective by splitting, and thus obtain an additional surface distribution of the powers. In addition to this, such a splitting of the lens can also be utilized to particular advantage for reducing the topheaviness which is found in wide angle lens systems and is frequently of importance, particularly in the case of higher speeds. This may be accomplished in the manner that, with such a splitting up, for instance, of a very thick lens, a part of the thickness of the lens may be replaced by a substantially equivalent thickness of an air space. With this last mentioned type of splitting, such a splitting air layer can in the course of the present invention also be provided with different curvatures of the split glass lenses enclosing it. The differences in radii of these limiting surfaces which may be introduced, may also serve to bring about small specific refinements in the image-forming properties. In the illustrative examples of the present invention given below, shapes of lens components are indicated by the numerical data in the tables, and various possibilities for splitting are indicated.

For the examples selected, there are shown schematically in the accompanying diagrams, lens sections of these objectives with the use of the same symbols used in the data tables. The conventional sequence is followed, the light being assumed to pass from left to right, and the various components being consecutively numbered in the same direction. The individual lens components are designated by L with a numerical subscript, and when a lens is split into two partial lenses, the parts are designated by the numerical subscript with additional subscripts $a$ and $b$ if split into two part, or $a$, $b$, and $c$ if split into three parts. Axial thicknesses are indicated by the letter d with a numerical subscript corresponding to the numerical designation of the particular lens component (with letters $a$, $b$, etc., if the lens is split). Axial spacings are indicated by the letter s with a numerical subscript combining the number of the lens immediately in front of and immediately behind the space. Thus, for example, $s_{12}$ indicates the space between lens $L_1$ and lens $L_2$, and $s_{34}$ indicates the space between $L_3$ and $L_4$, etc.

The radii of curvature of individual elements are indicated by the letter R with a subscript indicating the number of the individual element, for the radius of the front surface of the element, and with a prime plus a subscript number for the rear surface of the element. In accordance with conventional practice, plus signs of radii indicate surfaces convex toward the front, and minus signs of radii indicate surfaces concave toward the front.

All linear dimensions (radii, thicknesses, and spacings) are given, not as absolute dimensions, but on the basis of the equivalent focal length of the entire lens assembly or system as unity; that is, F = 1.0000. A spacing of zero in the data tables indicates surfaces cemented to each other. In each example, the maximum effective working aperture is indicated by $f$, and the angular field is indicated in the conventional way, and the back focus is also indicated, on the basis of the equivalent focal length F as unity.

The index of refraction of the glass used for each element is given in most of the tables of examples in the column headed $n_d$, but for some of the examples it is given in a separate table, for convenience of quick comparison of the indices of refraction of corresponding elements in different examples. When an objective is designed for use in only a very narrow spectral range, the refractive index refers specifically to this narrow spectral range. If the lens is to be used over a wide spectral range, as for example for picture taking in normal color photography, then instead of monochromatic image-error correction, an achromatism should be brought about over the wider spectral range required. For this purpose, in known manner, the glasses are so determined that the color dispersion of the glasses used, defined by their corresponding $v$ values (Abbe number $v$) then serves to eliminate the wavelength-dependent chromatic errors entering into consideration. During the course of making this invention it was found, by way of confirmation, that upon the development of the so-called initial forms or preforms for the objectives in accordance with this invention, and then in the course of the subsequent technical rough shaping (rough form) in known manner with the first correction normally customary here in the Seidel range (third order) the use of a standard index of refraction, for example, the index with reference to the yellow d-line of the helium spectrum, (wavelength 5876 Angstrom units) can take place in purely routine manner, the index of refraction for this wavelength being shown in many commercial catalogues of manufacturers of optical glasses.

In some of the tables of examples, the above mentioned Abbe number of the glass is given, under the heading $v_d$.

In the drawings as well as in the data tables of specific examples, the air lens spaces are indicated, $\alpha$ indicating the diverging air lens in the structural group A close in front of the stop or diaphragm space, and $\beta$ the corresponding diverging or negative-acting air lens in the structural group B, and $x$ indicating the collecting air space between the two optical groups A and B. Furthermore, in addition, the diverging air lens following the negative N in the rear member of the objective, is designated by $\gamma$, while the air space in front of the front surface of this negative component N is designated as the central vertex space CS. The individual members of the objective which are surrounded by air on both sides are furthermore indicated consecutively by the Roman numerals I, II, III, etc.

In the data tables, the right hand column with the heading "Des." gives the designation of the various members or groups according to the alphabetical designations used in the drawings, to enable quick comparison of the data tables with the drawings.

The headings of the various data tables also show the number of the figure of the drawings which is intended to illustrate the particular example in each table. In this connection it should be mentioned that the drawings are not necessarily drawn to scale, and are intended to illustrate the general arrangement and shape of various optical elements according to various specific examples of the invention, rather than illustrating exactly or precisely any one embodiment. Thus each figure of the drawings may serve to illustrate diagrammatically more than one specific example, even though there may be differences in the radii, thicknesses, and spacings of the elements of one example as compared with those of another example illustrated schematically in the same drawing. Also it should be noted that, for the sake of clarity of the diagrammatic or schematic illustration, each separate optical element has been shown somewhat spaced from the next adjacent element, notwithstanding that in some cases there is actually no spacing between elements, as will be apparent from the tabular data in the specific examples.

Example 1

$F = 1.0000$  $f/2.7$  (FIG. 1) $2\omega_o = 71°$  $s_\infty' = +1.2587\ F$

| Member | Lens | Radii | Thicknesses and Spacings | $n_d$ | Designation |
|---|---|---|---|---|---|
| I | $L_1$ | $R_1 = +2.2850$ | $d_1 = 0.0671$ | $n_1 = 1.6230$ | N,B |
|   |   | $R_1' = +0.8402$ |   |   |   |
|   |   |   | $s_{12} = 0.4104\ (\beta)$ |   | B |
| II | $L_2$ | $R_2 = -3.5873$ | $d_2 = 0.4216$ | $n_2 = 1.6970$ |   |
|   |   | $R_2' = -2.0361$ |   |   |   |
|   |   |   | $s_{23} = 0.0825\ (x)$ |   |   |
| III | $L_3$ | $R_3 = +0.8705$ | $d_3 = 0.0608$ | $n_3 = 1.7440$ | N,A |
|   |   | $R_3' = +0.6098$ |   |   |   |
|   |   |   | $s_{34} = 0.3200\ (\alpha)$ |   |   |
| IV | $L_{4a}$ | $R_{4a} = +1.0472$ | $d_{4a} = 0.4897$ | $n_{4a} = 1.7440$ | A |
|   |   | $R_{4a}' = -1.7786$ |   |   |   |
|   |   |   | $s_{4a,b} = 0$ |   |   |
|   | $L_{4b}$ | $R_{4b} = -1.7786$ | $d_{4b} = 0.2050$ | $n_{4b} = 1.6227$ |   |
|   |   | $R_{4b}' = -1.2905$ |   |   |   |
|   |   |   | $CS = 0.18245$ |   |   |
| V | $L_5$ | $R_5 = -1.0304$ | $d_5 = 0.0417$ | $n_5 = 1.8467$ | N |
|   |   | $R_5' = +1.4005$ |   |   |   |

Example 1-continued

| | | F = 1.0000 | f/2.7 | (FIG. 1) 2ω₀ = 71° Thicknesses and | | $s_\infty' = +1.2587\ F$ | |
|---|---|---|---|---|---|---|---|
| Member | Lens | | Radii | Spacings | | $n_d$ | Designation |
| | | | | $s_{56} = 0.0744\ (\gamma)$ | | | |
| VI | $L_6$ | $R_6 = -1.7081$ | | $d_6 = 0.1713$ | | $n_6 = 1.7308$ | |
| | | $R_6' = -0.8482$ | | $s_{67} = 0.00355$ | | | |
| VII | $L_7$ | $R_7 = +4.4726$ | | $d_7 = 0.1295$ | | $n_7 = 1.7290$ | |
| | | $R_7' = -1.384946$ | | | | | |

Example 2

| | | F = 1.0000 | f/2.5 | (FIG. 1) 2ω₀ = 71° Thicknesses and | | $s_\infty' = +1.2614\ F$ | |
|---|---|---|---|---|---|---|---|
| Member | Lens | | Radii | Spacings | | $n_d$ | Des. |
| I | $L_1$ | $R_1 = +1.800$ | | $d_1 = 0.060$ | | $n_1 = 1.623$ | N,B |
| | | $R_1' = +0.720$ | | | | | |
| | | | | $s_{12} = 0.380\ (\beta)$ | | | B |
| II | $L_2$ | $R_2 = \pm\ \text{plan}$ | | $d_2 = 0.600$ | | $n_2 = 1.638$ | |
| | | $R_2' = -1.800$ | | | | | |
| | | | | $s_{23} = 0.010\ (x)$ | | | |
| III | $L_3$ | $R_3 = +1.250$ | | $d_3 = 0.100$ | | $n_3 = 1.744$ | N,A |
| | | $R_3' = +0.630$ | | | | | |
| | | | | $s_{34} = 0.300\ (\alpha)$ | | | |
| IV | $L_{4a}$ | $R_{4a} = +0.910$ | | $d_{4a} = 0.290$ | | $n_{4a} = 1.744$ | A |
| | | $R_{4a}' = -0.910$ | | $s_{4a,b} = 0$ | | | |
| | $L_{4b}$ | $R_{4b} = -0.910$ | | $d_{4b} = 0.350$ | | $n_{4b} = 1.638$ | |
| | | $R_{4b}' = -1.730$ | | | | | |
| | | | | CS = 0.135 | | | |
| V | $L_5$ | $R_5 = -0.910$ | | $d_5 = 0.070$ | | $n_5 = 1.840$ | N |
| | | $R_5' = +1.450$ | | | | | |
| | | | | $s_{56} = 0.050\ (\gamma)$ | | | |
| VI | $L_6$ | $R_6 = -3.350$ | | $d_6 = 0.165$ | | $n_6 = 1.710$ | |
| | | $R_6' = -0.780$ | | $s_{67} = 0.002$ | | | |
| VII | $L_7$ | $R_7 = \pm\ \text{plan}$ | | $d_7 = 0.128$ | | $n_7 = 1.758$ | |
| | | $R_7' = -1.40126$ | | | | | |

Example 3

| | | F = 1.0000 | f/2.3 | (FIG. 1) 2ω₀ = 74° Thicknesses and | | $s_\infty' = +1.2587\ F$ | |
|---|---|---|---|---|---|---|---|
| Member | Lens | | Radii | Spacings | | $n_d$ | Des. |
| I | $L_1$ | $R_1 = +2.0864$ | | $d_1 = 0.1022$ | | $n_1 = 1.623$ | N,B |
| | | $R_1' = +0.7487$ | | | | | |
| | | | | $s_{12} = 0.3410\ (\beta)$ | | | B |
| II | $L_2$ | $R_2 = -4.3840$ | | $d_2 = 0.2463$ | | $n_2 = 1.685$ | |
| | | $R_2' = -2.2654$ | | | | | |
| | | | | $s_{23} = 0.0025\ (x)$ | | | |

Example 3-continued

| | | | (FIG. 1) | | |
|---|---|---|---|---|---|
| F = 1.0000 | | f/2.3 | $2\omega_o = 74°$ | | $s_\infty' = + 1.2587$ F |
| Member | Lens | Radii | Thicknesses and Spacings | $n_d$ | Des. |
| III | $L_3$ | $R_3 = + 1.0208$ | $d_3 = 0.0575$ | $n_3 = 1.744$ | N,A |
| | | $R_3' = + 0.6236$ | | | |
| | | | $s_{34} = 0.2450 \ (\alpha)$ | | |
| IV | $L_{4a}$ | $R_{4a} = + 1.0135$ | $d_{4a} = 0.5112$ | $n_{4a} = 1.744$ | |
| | | $R_{4a}' = - 1.1690$ | $s_{4a,b} = 0$ | | A |
| | $L_{4b}$ | $R_{4b} = - 1.1690$ | $d_{4b} = 0.2035$ | $n_{4b} = 1.596$ | |
| | | $R_{4b}' = - 1.2761$ | | | |
| | | | CS = 0.2186 | | |
| V | $L_5$ | $R_5 = - 0.8662$ | $d_5 = 0.0407$ | $n_5 = 1.847$ | N |
| | | $R_5' = - 1.7584$ | | | |
| | | | $s_{56} = 0.0739 \ (\gamma)$ | | |
| VI | $L_6$ | $R_6 = - 1.4808$ | $d_6 = 0.1207$ | $n_6 = 1.731$ | |
| | | $R_6' = - 0.7486$ | $s_{67} = 0.0028$ | | |
| VII | $L_7$ | $R_7 = + 5.1500$ | $d_7 = 0.1428$ | $n_7 = 1.729$ | |
| | | $R_7' = - 1.11751$ | | | |

Example 4

| | | | (FIG. 1) | | |
|---|---|---|---|---|---|
| F = 1.0000 | | f/2.1 | $2\omega_o = 74.5°$ | | $s_\infty' = + 1.2587$ F |
| Member | Lens | Radii | Thicknesses and Spacings | $n_d$ | Des. |
| I | $L_1$ | $R_1 = + 1.8875$ | $d_1 = 0.0558$ | $n_1 = 1.6230$ | N,B |
| | | $R_1' = + 0.7626$ | | | |
| | | | $s_{12} = 0.3876 \ (\beta)$ | | B |
| II | $L_2$ | $R_2 = - 2.4000$ | $d_2 = 0.4348$ | $n_2 = 1.6450$ | |
| | | $R_2' = - 1.6645$ | | | |
| | | | $s_{23} = 0.0100 \ (x)$ | | |
| III | $L_3$ | $R_3 = + 0.8518$ | $d_3 = 0.0620$ | $n_3 = 1.7440$ | N,A |
| | | $R_3' = + 0.6100$ | | | |
| | | | $s_{34} = 0.3232 \ (\alpha)$ | | |
| IV | $L_{4a}$ | $R_{4a} = + 0.8942$ | $d_{4a} = 0.5194$ | $n_{4a} = 1.7440$ | A |
| | | $R_{4a}' = - 0.7070$ | $s_{4a,b} = 0$ | | |
| | $L_{4b}$ | $R_{4b} = - 0.7070$ | $d_{4b} = 0.1008$ | $n_{4b} = 1.6690$ | |
| | | $R_{4b}' = - 2.3013$ | | | |
| | | | CS = 0.1462 | | |
| V | $L_5$ | $R_5 = - 0.9297$ | $d_5 = 0.0421$ | $n_5 = 1.8470$ | N |
| | | $R_5' = + 1.3678$ | | | |
| | | | $s_{56} = 0.0692 \ (\gamma)$ | | |
| VI | $L_6$ | $R_6 = - 2.8018$ | $d_6 = 0.0967$ | $n_6 = 1.7320$ | |
| | | $R_6' = - 0.8018$ | $s_{67} = 0.0033$ | | |
| VII | $L_7$ | $R_7 = + 148.81$ | $d_7 = 0.1310$ | $n_7 = 1.7420$ | |
| | | $R_7' = - 1.175335$ | | | |

Example 5

| | | | (FIG. 1) | | |
|---|---|---|---|---|---|
| F = 1.0000 | | f/2.07 | $2\omega_0 = 74.5°$ | $s_\infty' = +1.2586\,F$ | |
| Member | Lens | Radii | Thicknesses and Spacings | $n_d$ | Des. |
| I | $L_1$ | $R_1 = +1.8588$ | $d_1 = 0.0566$ | $n_1 = 1.623$ | N,B |
| | | $R_1' = +0.8055$ | | | |
| | | | $s_{12} = 0.3646\,(\beta)$ | | B |
| II | $L_2$ | $R_2 = -2.7587$ | $d_2 = 0.5530$ | $n_2 = 1.644$ | |
| | | $R_2' = -2.0255$ | | | |
| | | | $s_{23} = 0.0034\,(x)$ | | |
| III | $L_3$ | $R_3 = +0.8573$ | $d_3 = 0.0601$ | $n_3 = 1.784$ | N,A |
| | | $R_3' = +0.6001$ | | | |
| | | | $s_{34} = 0.3053\,(\alpha)$ | | |
| IV | $L_{4a}$ | $R_{4a} = +0.9508$ | $d_{4a} = 0.4842$ | $n_{4a} = 1.744$ | A |
| | | $R_{4a}' = -0.7125$ | $s_{4a,b} = 0$ | | |
| | $L_{4b}$ | $R_{4b} = -0.7125$ | $d_{4b} = 0.0775$ | $n_{4b} = 1.664$ | |
| | | $R_{4b}' = -2.5621$ | | | |
| | | | CS = 0.23425 | | |
| V | $L_5$ | $R_5 = -0.9797$ | $d_5 = 0.0434$ | $n_5 = 1.847$ | N |
| | | $R_5' = +1.5456$ | | | |
| | | | $s_{56} = 0.0664\,(\gamma)$ | | |
| VI | $L_6$ | $R_6 = -3.0370$ | $d_6 = 0.1024$ | $n_6 = 1.727$ | |
| | | $R_6' = -0.7763$ | $s_{67} = 0.0057$ | | |
| VII | $L_7$ | $R_7 = +63.570$ | $d_7 = 0.1201$ | $n_7 = 1.776$ | |
| | | $R_7' = -1.326092$ | | | |

Example 6

| | | | (FIG. 1) | | |
|---|---|---|---|---|---|
| F = 1.0000 | | f/2.1 | $2\omega_0 = 74.5°$ | $s_\infty' = +1.2583\,F$ | |
| Member | Lens | Radii | Thicknesses and Spacings | $n_d/\nu_d$ | Des. |
| I | $L_1$ | $R_1 = +2.00966$ | $d_1 = 0.062399$ | 1.62299/58.06 | N,B |
| | | $R_1' = +0.78299$ | | | |
| | | | $s_{12} = 0.369912\,(\beta)$ | | B |
| II | $L_2$ | $R_2 = -3.39819$ | $d_2 = 0.537113$ | 1.65844/50.88 | |
| | | $R_2' = -2.00966$ | | | |
| | | | $s_{23} = 0.002413\,(x)$ | | |
| III | $L_3$ | $R_3 = +0.93057$ | $d_3 = 0.101010$ | 1.74400/44.77 | N,A |
| | | $R_3' = +0.61306$ | | | |
| | | | $s_{34} = 0.275107\,(\alpha)$ | | |
| IV | $L_{4a}$ | $R_{4a} = +0.91068$ | $d_{4a} = 0.288552$ | 1.74400/44.77 | A |
| | | $R_{4a}' = -0.84138$ | $s_{4a,b} = 0$ | | |
| | $L_{4b}$ | $R_{4b} = -0.84138$ | $d_{4b} = 0.347848$ | 1.63854/55.38 | |
| | | $R_{4b}' = -1.80405$ | | | |
| | | | CS = 0.132037 | | |
| V | $L_5$ | $R_5 = -0.92388$ | $d_5 = 0.065846$ | 1.8466/23.82 | N |
| | | $R_5' = +1.44334$ | | | |
| | | | $s_{56} = 0.061365\,(\gamma)$ | | |

Example 6-continued

| | | | (FIG. 1) $2\omega_o = 74.5°$ | $s_\infty' = +1.2583\ F$ | |
|---|---|---|---|---|---|
| $F = 1.0000$ | | $f/2.1$ | Thicknessess and | | |
| Member | Lens | Radii | Spacings | $n_d/\nu_d$ | Des. |
| VI | $L_6$ | $R_6 = -3.37381$ | $d_6 = 0.163409$ | 1.71300/53.85 | |
| | | $R_6' = -0.78864$ | $s_{67} = 0.003103$ | | |
| VII | $L_7$ | $R_7 = +153.991$ | $d_7 = 0.131348$ | 1.75719/47.83 | |
| | | $R_7' = -1.392357$ | | | |

Example 7

Figure 2:
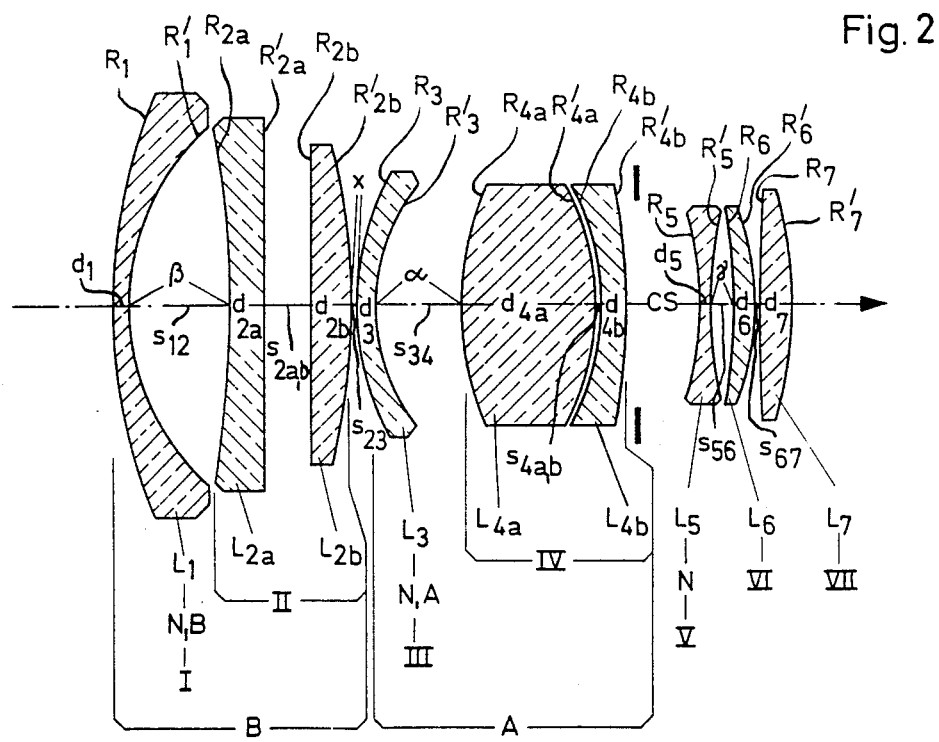
FIGS. 2–15 are similar diagrams illustrating other embodiments of the invention.

| | | | (FIG. 2) $2\omega_o = 74°$ | $s_\infty' = +1.2586\ F$ | |
|---|---|---|---|---|---|
| $F = 1.0000$ | | $f/2.1$ | Thicknesses and | $n_d$ | Des. |
| Member | Lens | Radii | Spacings | | |
| I | $L_1$ | $R_1 = +1.8408$ | $d_1 = 0.05593$ | $n_1 = 1.6230$ | N.B |
| | | $R_1' = +0.8063$ | | | |
| | | | $s_{12} = 0.35616\ (\beta)$ | | |
| II | $L_{2a}$ | $R_{2a} = -2.9938$ | $d_{2a} = 0.12068$ | $n_{2a} = 1.6441$ | B |
| | | $R_{2a}' = \pm$ plan | $s_{2a,b} = 0.16223$ | | |
| | $L_{2b}$ | $R_{2b} = \pm$ plan | $d_{2b} = 0.15518$ | $n_{2b} = 1.6441$ | |
| | | $R_{2b}' = -2.1862$ | | | |
| | | | $s_{23} = 0.00172\ (x)$ | | |
| III | $L_3$ | $R_3 = +0.9065$ | $d_3 = 0.06166$ | $n_3 = 1.7845$ | N,A |
| | | $R_3' = +0.6183$ | | | |
| | | | $s_{34} = 0.30560\ (\alpha)$ | | |
| IV | $L_{4a}$ | $R_{4a} = +0.9810$ | $d_{4a} = 0.48840$ | $n_{4a} = 1.7440$ | A |
| | | $R_{4a}' = -0.8015$ | $s_{4a,b} = 0$ | | |
| | $L_{4b}$ | $R_{4b} = -0.8015$ | $d_{4b} = 0.08630$ | $n_{4b} = 1.6622$ | |
| | | $R_{4b}' = -2.2830$ | | | |
| | | | $CS = 0.26028$ | | |
| V | $L_5$ | $R_5 = -0.9843$ | $d_5 = 0.04270$ | $n_5 = 1.8466$ | N |
| | | $R_5' = +1.6384$ | | | |
| | | | $s_{56} = 0.06852\ (\gamma)$ | | |
| VI | $L_6$ | $R_6 = -2.1270$ | $d_6 = 0.09600$ | $n_6 = 1.7223$ | |
| | | $R_6' = -0.7800$ | $s_{67} = 0.00355$ | | |
| VII | $L_7$ | $R_7 = +9.5810$ | $d_7 = 0.12045$ | $n_7 = 1.7720$ | |
| | | $R_7' = -1.26038$ | | | |

Example 8

Figure 3:
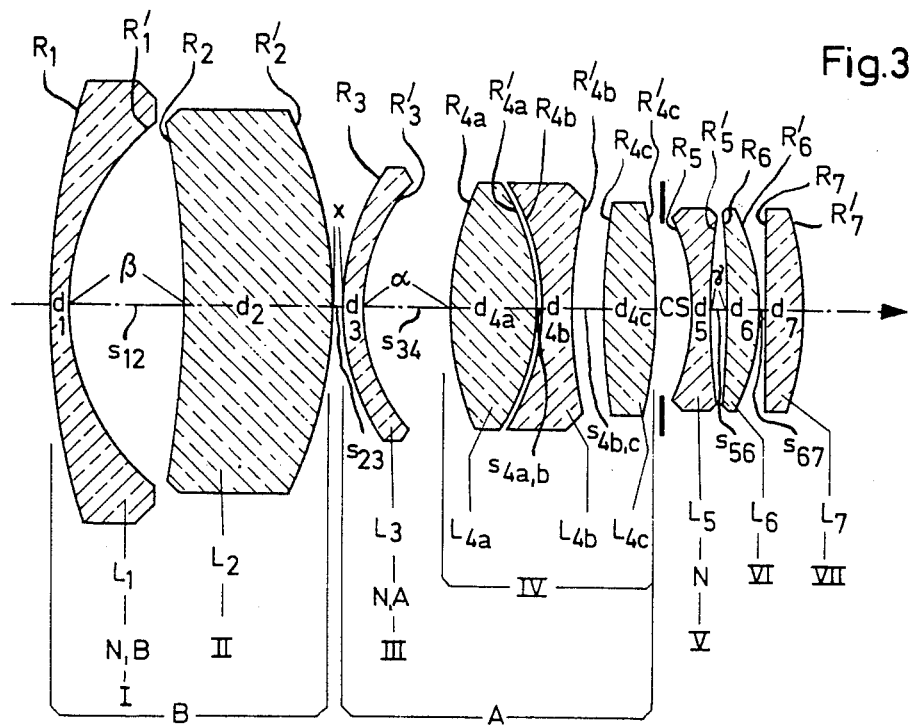

| | | | (FIG. 3) $2\omega_o = 74.5°$ | $s_\infty' = +1.2590\ F$ | |
|---|---|---|---|---|---|
| $F = 1.0000$ | | $f/2.1$ | Thicknessess and | | |
| Member | Lens | Radii | Spacings | $n_d/\nu_d$ | Des. |
| I | $L_1$ | $R_1 = +2.27339$ | $d_1 = 0.063321$ | 1.62299/58.06 | N.B |
| | | $R' = +0.79256$ | | | |
| | | | $s_{12} = 0.401806\ (\beta)$ | | B |
| II | $L_2$ | $R_2 = -2.85344$ | $d_2 = 0.536455$ | 1.63854/55.38 | |
| | | $R_2' = -1.68505$ | | | |
| | | | $s_{23} = 0.003623\ (x)$ | | |
| III | $L_3$ | $R_3 = +0.84159$ | $d_3 = 0.064771$ | 1.7440/44.77 | N,A |
| | | $R_3' = +0.62461$ | | | |

Example 8-continued

| | | | (FIG. 3) | | |
|---|---|---|---|---|---|
| $F = 1.0000$ | | f/2.1 | $2\omega_e = 74.5°$ | | $s_x' = +1.2590\,F$ |
| Member | Lens | Radii | Thicknessess and Spacings | $n_d/\nu_d$ | Des. |

| Member | Lens | Radii | Thicknesses and Spacings | $n_d/\nu_d$ | Des. |
|---|---|---|---|---|---|
| IV | $L_{4a}$ | $R_{4a} = +0.92793$ <br> $R_{4a}' = -0.69260$ | $s_{34} = 0.310465\,(\alpha)$ <br> $d_{4a} = 0.315917$ <br> $s_{4a,b}\ 32\ 0$ | 1.74400/44.77 | A |
| | $L_{4b}$ | $R_{4b} = -0.69260$ <br> $R_{4b}' = +1.85739$ | $d_{4b} = 0.112460$ <br> $s_{4b,c} = 0.113875$ | 1.67003/47.12 | |
| | $L_{4c}$ | $R_{4c} = +2.96048$ <br> $R_{4c}' = -1.86261$ | $d_{4c} = 0.180268$ | 1.70181/41.02 | |
| | | | CS = 0.125539 | | |
| V | $L_5$ | $R_5 = -0.83832$ <br> $R_5' = +1.79315$ | $d_5 = 0.067324$ | 1.84666/23.82 | N |
| VI | $L_6$ | $R_6 = -3.02071$ <br> $R_6' = -0.84727$ | $s_{56} = 0.060112\,(\gamma)$ <br> $d_6 = 0.106456$ <br> $s_{67} = 0.026605$ | 1.71300/53.85 | |
| VII | $L_7$ | $R_7 = -45.4622$ <br> $R_7' = -1.163478$ | $d_7 = 0.130335$ | 1.78831/47.37 | |

Example 9

Figure 4:
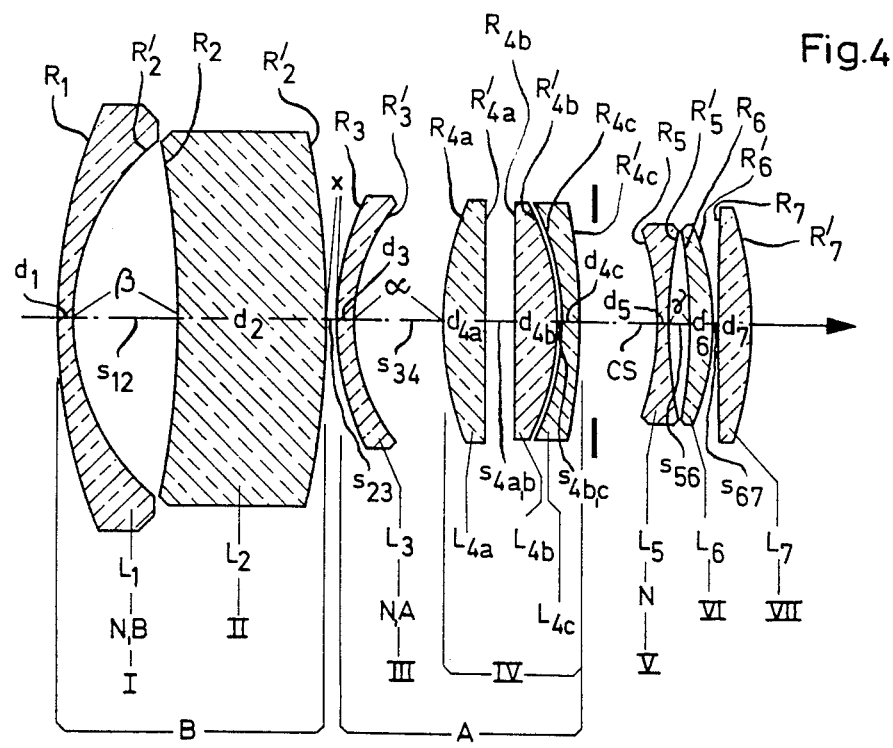

| | | | (FIG. 4) | | |
|---|---|---|---|---|---|
| $F = 1.0000$ | | f/2.3 | $2\omega_e = 73°$ | | $s_\infty' = +1.2586\,F$ |
| | | | Thicknesses and Spacings | $n_d$ | Des. |

| Member | Lens | Radii | Thicknesses and Spacings | $n_d$ | Des. |
|---|---|---|---|---|---|
| I | $L_1$ | $R_1 = +1.8408$ <br> $R_1' = +0.8063$ | $d_1 = 0.05593$ | $n_1 = 1.6230$ | N,B |
| II | $L_2$ | $R_2 = -2.9938$ <br> $R_2' = -2.1857$ | $s_{12} = 0.35616\,(\beta)$ <br> $d_2 = 0.54240$ | $n_2 = 1.6441$ | B |
| III | $L_3$ | $R_3 = +0.9065$ <br> $R_3' = +0.6183$ | $s_{23} = 0.00185\,(x)$ <br> $d_3 = 0.06165$ | $n_3 = 1.7845$ | N,A |
| IV | $L_{4a}$ | $R_{4a} = +0.9810$ <br> $R_{4a}' = \pm$ plan | $s_{34} = 0.30565\,(\alpha)$ <br> $d_{4a} = 0.15517$ <br> $s_{4a,b} = 0.10200$ | $n_{4a} = 1.7440$ | A |
| | $L_{4b}$ | $R_{4b} = \pm$ plan <br> $R_{4b}' = -0.8015$ | $d_{4b} = 0.15517$ <br> $s_{4b,c} = 0$ | $n_{4b} = 1.7440$ | |
| | $L_{4c}$ | $R_{4c} = -0.8015$ <br> $R_{4c}' = -2.2834$ | $d_{4c} = 0.08630$ | $n_{4c} = 1.6622$ | |
| | | | CS = 0.26028 | | |
| V | $L_5$ | $R_5 = -0.9843$ <br> $R_5' = +1.6383$ | $d_5 = 0.04270$ | $n_5 = 1.8466$ | N |
| VI | $L_6$ | $R_6 = -2.1270$ <br> $R_6' = -0.7800$ | $s_{56} = 0.06851\,(\gamma)$ <br> $d_6 = 0.09600$ <br> $s_{67} = 0.00355$ | $n_6 = 1.7223$ | |
| VII | $L_7$ | $R_7 = +9.5810$ <br> $R_7' = -1.26031$ | $d_7 = 0.12044$ | $n_7 = 1.7720$ | |

Example 10

Figure 5:
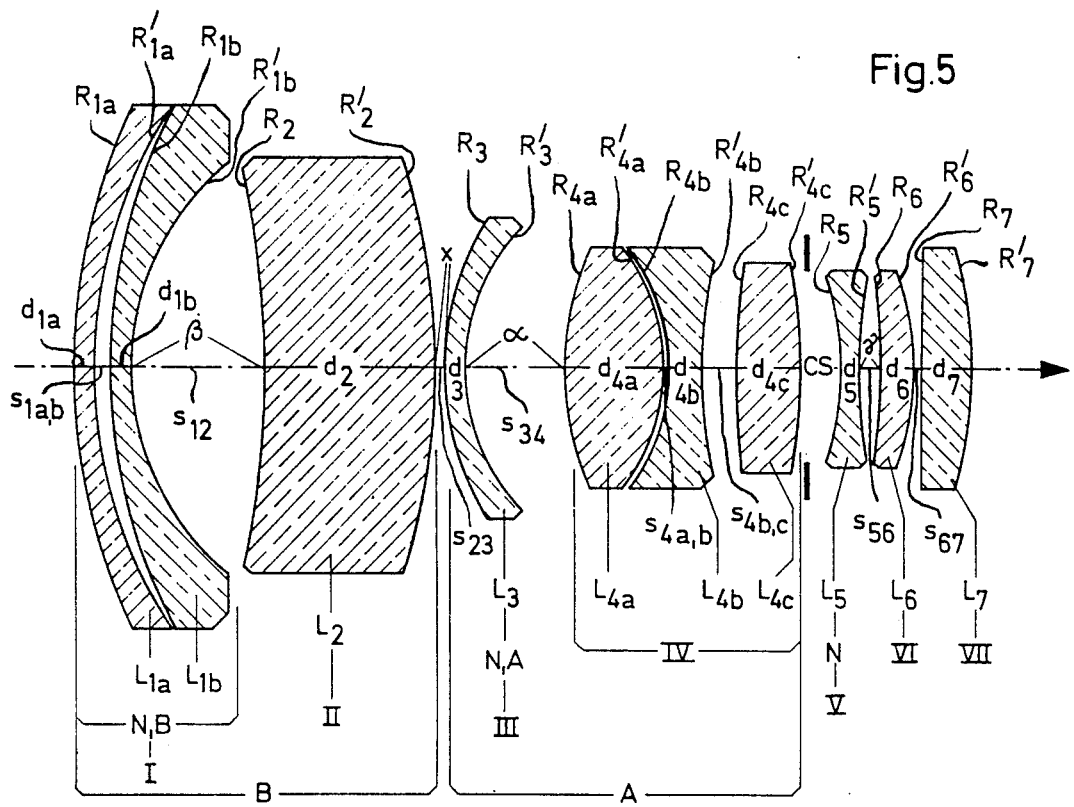

| | | | (FIG. 5) | | |
|---|---|---|---|---|---|
| F = 1.0000 | | f/2.3 | $2\omega_o = 74°$ | | $s_\infty' = +1.2591\ F$ |
| Member | Lens | Radii | Thicknesses and Spacings | $n_d$ | Des. |

| Member | Lens | Radii | Thicknesses and Spacings | $n_d$ | Des. |
|---|---|---|---|---|---|
| I | $L_{1a}$ | $R_{1a} = +1.8000$ | $d_{1a} = 0.06825$ | $n_{1a} = 1.713$ | N,B / B |
| | | $R_{1a}' = +1.4700$ | $s_{1a,b} = 0.05200$ | | |
| | $L_{1b}$ | $R_{1b} = +1.8000$ | $d_{1b} = 0.06480$ | $n_{1b} = 1.620$ | |
| | | $R_{1b}' = +0.8000$ | | | |
| | | | $s_{12} = 0.40200\ (\beta)$ | | |
| II | $L_2$ | $R_2 = -2.7735$ | $d_2 = 0.56460$ | $n_2 = 1.639$ | |
| | | $R_2' = -1.6863$ | | | |
| | | | $s_{23} = 0.00360\ (x)$ | | |
| III | $L_3$ | $R_3 = +0.8416$ | $d_3 = 0.06477$ | $n_3 = 1.744$ | N,A |
| | | $R_3' = +0.6246$ | | | |
| | | | $s_{34} = 0.31046\ (\alpha)$ | | |
| | $L_{4a}$ | $R_{4a} = +0.9279$ | $d_{4a} = 0.31654$ | $n_{4a} = 1.744$ | A |
| | | | $s_{4a,b} = 0$ | | |
| IV | $L_{4b}$ | $R_{4b} = -0.6246$ | $d_{4b} = 0.11200$ | $n_{4b} = 1.670$ | |
| | | $R_{4b}' = +1.8000$ | $s_{4b,c} = 0.10950$ | | |
| | $L_{4c}$ | $R_{4c} = +3.1404$ | $d_{4c} = 0.18550$ | $n_{4c} = 1.702$ | |
| | | $R_{4c}' = -1.8000$ | | | |
| | | | CS = 0.12550 | | |
| V | $L_5$ | $R_5 = -0.416$ | $d_5 = 0.06488$ | $n_5 = 1.848$ | N |
| | | $R_5' = +1.8000$ | | | |
| | | | $s_{56} = 0.06200\ (\gamma)$ | | |
| VI | $L_6$ | $R_6 = -2.7735$ | $d_6 = 0.10650$ | $n_6 = 1.713$ | |
| | | $R_6' = -0.8473$ | | | |
| | | | $S_{67} = 0.02660$ | | |
| VII | $L_7$ | $R_7 = \pm\ \text{plan}$ | $d_7 = 0.16136$ | $n_7 = 1.788$ | |
| | | $R_7' = \pm\ \text{plan}$ | | | |

Example 11

Figure 6:
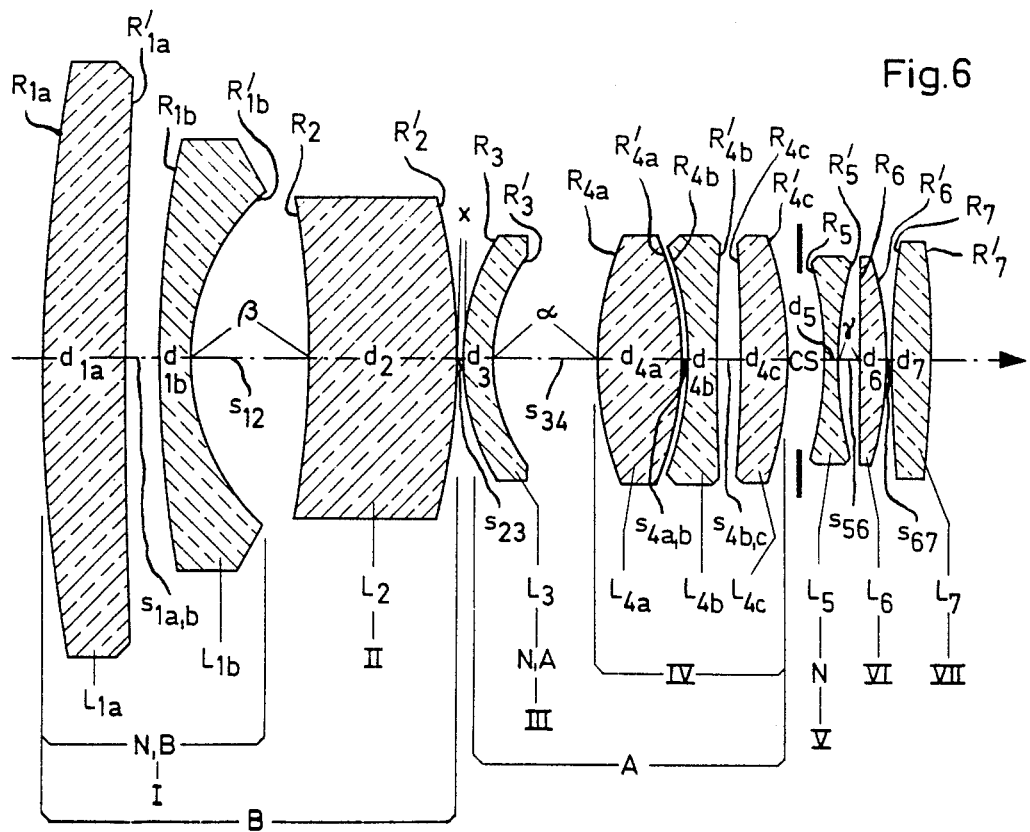

| | | | (FIG. 6) | | |
|---|---|---|---|---|---|
| F = 1.0000 | | f/2.1 | $2\omega_o = 74°$ | | $S_\infty' = +1.2621\ F$ |
| Member | Lens | Radii | Thicknesses and Spacings | $n_d/\nu_d$ | Des. |

| Member | Lens | Radii | Thicknesses and Spacings | $n_d/\nu_d$ | Des. |
|---|---|---|---|---|---|
| I | $L_{1a}$ | $R_{1a} = +6.06896$ | $d_{1a} = 0.274276$ | 1.62299/58.06 | N,B / B |
| | | $R_{1a}' = +26.81329$ | $s_{1a,b} = 0.116872$ | | |
| | $L_{1b}$ | $R_{1b} = +4.11457$ | $d_{1b} = 0.103334$ | 1.62299/58.06 | |
| | | $R_{1b}' = +0.75189$ | | | |
| | | | $s_{12} = 0.406824\ (\beta)$ | | |
| II | $L_2$ | $R_2 = -2.67095$ | $d_2 = 0.527744$ | 1.63854/55.38 | |
| | | $R_2' = -1.66321$ | | | |
| | | | $s_{23} = 0.001945\ (x)$ | | |
| III | $L_3$ | $R_3 = +0.79976$ | $d_3 = 0.109386$ | 1.74400/44.77 | N,A |
| | | $R_3' = +0.61121$ | $s_{34} = 0.345903\ (\alpha)$ | | |
| | $L_{4a}$ | $R_{4a} = +0.99589$ | $d_{4a} = 0.326579$ | 1.74400/44.77 | A |
| | | $R_{4a}' = -1.35427$ | $s_{4a,b} = 0$ | | |
| IV | $L_{4b}$ | $R_{4b} = -1.35427$ | $d_{4b} = 0.100093$ | 1.67003/47.12 | |
| | | $R_{4b}' = +9.44666$ | $s_{4b,c} = 0.076459$ | | |
| | $L_{4c}$ | $R_{4c} = -4.68440$ | $d_{4c} = 0.165648$ | 1.70181/41.02 | |
| | | $R_4' = -1.24868$ | | | |
| | | | CS = 0.134524 | | |

Example 11-continued

| | | | (FIG. 6) | | |
|---|---|---|---|---|---|
| F = 1.0000 | | f/2.1 | $2\omega_0 = 74°$ | $s_∞' = + 1.2621$ F | |
| Member | Lens | Radii | Thicknesses and Spacings | $n_d/\nu_d$ | Des. |
| V | $L_5$ | $R_5 = - 1.08993$ | $d_5 = 0.047369$ | 1.84666/23.82 | N |
| | | $R_5' = + 1.41522$ | $s_{56} = 0.071779$ | $(\tau)$ | |
| VI | $L_6$ | $R_6 = - 13.44784$ | $d_6 = 0.107141$ | 1.71300/53.85 | |
| | | $R_6' = - 0.92784$ | $s_{67} = 0.006631$ | | |
| VII | $L_7$ | $R_7 = + 3.60922$ | $d_7 = 0.143634$ | 1.78831/47.37 | |
| | | $R_7' = - 2.87824$ | | | |

Example 12

Figure 7:
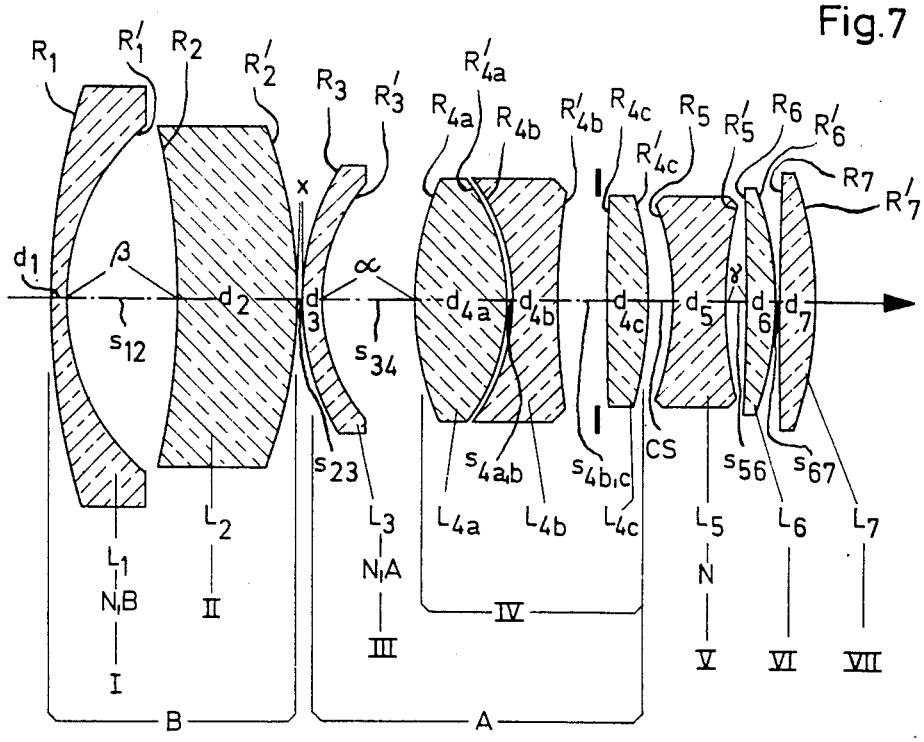

| | | | (FIG. 7) | | |
|---|---|---|---|---|---|
| F = 1.0000 | | f/2.1 | $2\omega_0 = 74.5°$ | $s_∞' = + 1.2687$ F | |
| Member | Lens | Radii | Thicknesses and Spacings | $n_d/\nu_d$ | Des. |
| I | $L_1$ | $R_1 = + 2.66056$ | $d_1 = 0.055207$ | 1.63854/55.38 | N,B |
| | | $R_1' = + 0.74984$ | $s_{12} = 0.383671$ | $(\beta)$ | B |
| II | $L_2$ | $R_2 = - 2.25474$ | $d_2 = 0.412143$ | 1.66446/35.84 | |
| | | $R_2' = - 1.59625$ | $s_{23} = 0.001736$ | $(x)$ | |
| III | $L_3$ | $R_3 = + 1.05161$ | $d_3 = 0.079859$ | 1.74400/44.77 | N,A |
| | | $R_3' = + 0.72856$ | $s_{34} = 0.246869$ | $(\alpha)$ | |
| | $L_{4a}$ | $R_{4a} = + 1.10591$ | $d_{4a} = 0.312492$ | 1.74400/44.77 | |
| | | $R_{4a}' = - 0.75526$ | $s_{4a,b} = 0$ | | |
| IV | $L_{4b}$ | $R_{4b} = - 0.75526$ | $d_{4b} = 0.238189$ | 1.60562/43.92 | A |
| | | $R_{4b}' = + 5.66375$ | $s_{4b,c} = 0.173607$ | | |
| | $L_{4c}$ | $R_{4c} = + 4.69746$ | $d_{4c} = 0.207287$ | 1.72000/50.42 | |
| | | $R_4' = - 1.46420$ | | | |
| | | | CS = 0.061110 | | |
| V | $L_5$ | $R_5 = - 0.89762$ | $d_5 = 0.269785$ | 1.80518/25.43 | N |
| | | $R_5' = + 1.67871$ | $s_{56} = 0.071526$ | $(\tau)$ | |
| VI | $L_6$ | $R_6 = - 4.37108$ | $d_6 = 0.099998$ | 1.71300/53.85 | |
| | | $R_6' = - 1.08230$ | $s_{67} = 0.003472$ | | |
| VII | $L_7$ | $R_7 = - 25.29870$ | $d_7 = 0.105206$ | 1.78831/47.37 | |
| | | $R_7' = - 1.25886$ | | | |

Example 13

| | | | (FIG. 7) | | |
|---|---|---|---|---|---|
| F = 1.0000 | | f/2.1 | $2\omega_0 = 74.5°$ | $s_∞' = + 1.2709$ F | |
| Member | Lens | Radii | Thicknesses and Spacings | $n_d/\nu_d$ | Des. |
| I | $L_1$ | $R_1 = + 2.26535$ | $d_1 = 0.055520$ | 1.61765/55.15 | N,B |
| | | $R_1' = + 0.76789$ | $s_{12} = 0.379649$ | $(\beta)$ | B |
| II | $L_2$ | $R_2 = - 2.33423$ | $d_2 = 0.408954$ | 1.66446/35.84 | |
| | | $R_2' = - 1.59449$ | $s_{23} = 0.011632$ | $(x)$ | |
| III | $L_3$ | $R_3 = + 0.86457$ | $d_3 = 0.074340$ | 1.74400/44.77 | N,A |
| | | $R_3' = + 0.64179$ | $s_{34} = 0.310552$ | $(\alpha)$ | |
| | | $R_{4a} = + 1.06323$ | | | |

Example 13-continued

| | | | (FIG. 7) | | |
|---|---|---|---|---|---|
| F = 1.0000 | | f/2.1 | $2\omega_e = 74.5°$ | $s_\infty' = + 1.2709\ F$ | |
| Member | Lens | Radii | Thicknesses and Spacings | $n_d/\nu_d$ | Des. |
| IV | $L_{4a}$ | $R_{4a} = -0.69612$ | $d_{4a} = 0.312497$ | 1.74400/44.77 | A |
|  |  | $R_{4a}' = -0.69612$ | $s_{4a,b} = 0$ |  |  |
|  | $L_{4b}$ | $R_{4b} = -0.69612$ | $d_{4b} = 0.178818$ | 1.63930/45.18 |  |
|  |  | $R_{4b}' = +1.00083$ | $s_{4b,c} = 0.170137$ |  |  |
|  | $L_{4c}$ | $R_{4c} = +6.25996$ | $d_{4c} = 0.150346$ | 1.72000/50.42 |  |
|  |  | $R_{4c}' = -1.33957$ |  |  |  |
|  |  |  | CS = 0.086596 |  |  |
| V | $L_5$ | $R_5 = -0.84073$ | $d_5 = 0.193366$ | 1.80518/25.43 | N |
|  |  | $R_5' = +1.86314$ | $s_{56} = 0.073888$ | $(\tau)$ |  |
| VI | $L_6$ | $R_6 = -4.21844$ | $d_6 = 0.107048$ | 1.71300/53.85 |  |
|  |  | $R_6' = -1.01593$ | $s_{67} = 0.001840$ |  |  |
| VII | $L_7$ | $R_7 = +44.35558$ | $d_7 = 0.128783$ | 1.78831/47.37 |  |
|  |  | $R_7' = -1.30095$ |  |  |  |

Example 14

Figure 8:
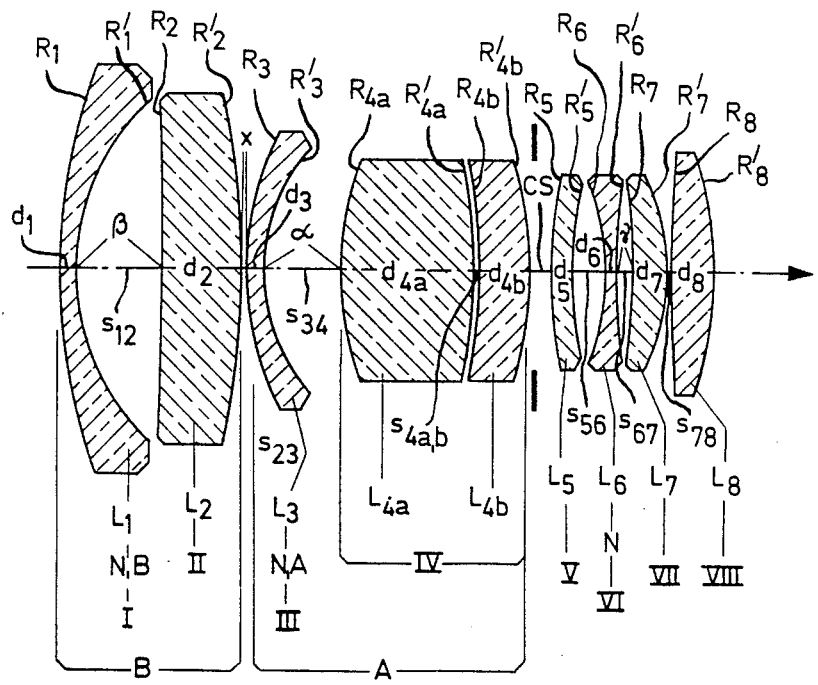

| | | | (FIG. 8) | | |
|---|---|---|---|---|---|
| F = 1.0000 | | f/2.1 | $2\omega_o = 75°$ | $s_\infty' = + 1.2587\ F$ | |
| Member | Lens | Radii | Thicknesses and Spacings | $n_d$ | Des. |
| I | $L_1$ | $R_1 = +1.9880$ | $d_1 = 0.05362$ | $n_1 = 1.6230$ | N,B |
|  |  | $R_1' = +0.7849$ | $s_{12} = 0.30053$ | $(\beta)$ | B |
| II | $L_2$ | $R_2 = -10.757$ | $d_2 = 0.27752$ | $n_2 = 1.7031$ |  |
|  |  | $R_2' = -3.0655$ | $s_{23} = 0.00262$ | $(x)$ |  |
| III | $L_3$ | $R_3 = +0.9888$ | $d_3 = 0.05680$ | $n_3 = 1.7844$ | N,A |
|  |  | $R_3' = +0.5840$ | $s_{34} = 0.26857$ | $(\alpha)$ |  |
| IV | $L_{4a}$ | $R_{4a} = +1.0145$ | $d_{4a} = 0.49112$ | $n_{4a} = 1.7440$ | A |
|  |  | $R_{4a}' = -1.6585$ | $s_{4a,b} = 0$ |  |  |
|  | $L_{4b}$ | $R_{4b} = -1.6585$ | $d_{4b} = 0.17648$ | $n_{4b} = 1.6401$ |  |
|  |  | $R_{4b}' = -1.1749$ |  |  |  |
|  |  |  | CS = 0.07075 |  |  |
| V | $L_5$ | $R_5 = +1.5440$ | $d_5 = 0.07290$ | $n_5 = 1.7013$ |  |
|  |  | $R_5' = +1.2392$ | $s_{56} = 0.11513$ |  |  |
| VI | $L_6$ | $R_6 = -0.7751$ | $d_6 = 0.04137$ | $n_6 = 1.8466$ | N |
|  |  | $R_6' = +2.2732$ | $s_{67} = 0.06383$ | $(\tau)$ |  |
| VII | $L_7$ | $R_7 = -1.8810$ | $d_7 = 0.12565$ | $n_7 = 1.7290$ |  |
|  |  | $R_7' = -0.6893$ | $s_{78} = 0.00218$ |  |  |
| VIII | $L_8$ | $R_8 = +4.9915$ | $d_8 = 0.15193$ | $n_8 = 1.7347$ |  |
|  |  | $R_8' = -1.317666$ |  |  |  |

The above examples 1–14 have been so selected from the broad scope of use provided by the new principle of design in accordance with this invention, that in all of them the negative meniscus N, A (component III) contained in group A close to the central space CS is developed as an individual lens element, in order to facilitate mutual comparison. The same applies also to the negative lens N which is located in the back group or member behind the space CS. In these above 14 examples, use has been made, at various places, of the above described splitting of a lens. Thus in examples 10 and 11, the negative meniscus N, B (component I) of the front group B is divided into two individual lenses $L_{1a}$ and $L_{1b}$, these two adjacent individual lens elements having powers of the same sign, in example 10, and powers of opposite sign, in example 11.

In examples 1–7, as well as in example 14, the positive individual member (IV) of the group A is composed of two individual lens elements, and thus forms a doublet, while in examples 8–13 this member is formed as a positive triplet set. In the latter case, the third or rear lens of this triplet is brought for reasons of correction (for instance, due to the glass selected) very close to the rear member of the objective, and thus to the negative component N, thus making the central vertex space CS in front of the negative element N very small, and not advantageous for the placing of a stop or diaphragm, especially an iris diaphragm. In accordance with examples 12 and 13 such a diaphragm can be shifted into the air space preceding this third lens element $L_{4c}$ in order in this way to provide an easier mechanical and structural arrangement.

Example 14 shows a variation in which there has been provided, behind the group A and directly in front of the negative element N of the rear member, a meniscus which serves as an additional corrector, and has its concave side facing the negative component N. This meniscus serves for additional increase in definition in the lateral field of the picture, and simultaneously provides a particularly good balancing-out of the corresponding surface individual coefficients of the distortion error.

Objectives according to the present invention are furthermore excellently suited for obtaining extremely high definition over their wide-angle field of view, since in practical embodiments of the invention, use can be made of aspherical surface effects which reduce residual aberration. For this purpose an aspherical shape which preferably borders on air is introduced, preferably on a lens surface of small diameter. For this additional improvement, it is preferred to develop the aspherical surface on a glass-air surface arranged in the vicinity of the stop or diaphragm, in this instance in the rear member, since in this structural region of the objective the lens diameters of the individual elements lie near their minimum diameter, as a result of which there is obtained the possibility of particularly favorable and reliable manufacture.

Examples 15–21 have been provided, in this manner, with such aspherical surface shapes. In order to facilitate mutual comparison, these aspherical surfaces have been placed uniformly on the front surface (radius $R_6$) of the first collecting part of the rear member which is surrounded by air on both sides. This front surface adjoins the air lens $\gamma$ behind the negative component N of the rear group.

It is furthermore shown in some of these examples that individual lens components can be split to provide neighboring radii (at opposite sides of the split) having either the same directional sign or a different directional sign, as shown by the development of the collecting lens member II in the group B of examples 15 and 16. In these two examples it has also been shown that the inner air space at this split may be even smaller (as in example 15) or larger (as in example 16) than the sum of the axial center thicknesses of the two split elements $L_{2a}$ and $L_{2b}$, whereby specifically in the last mentioned case, the topheaviness of such high-power wide-angle objectives can be reduced in a particularly advantageous manner.

Example 15

Figure 9:
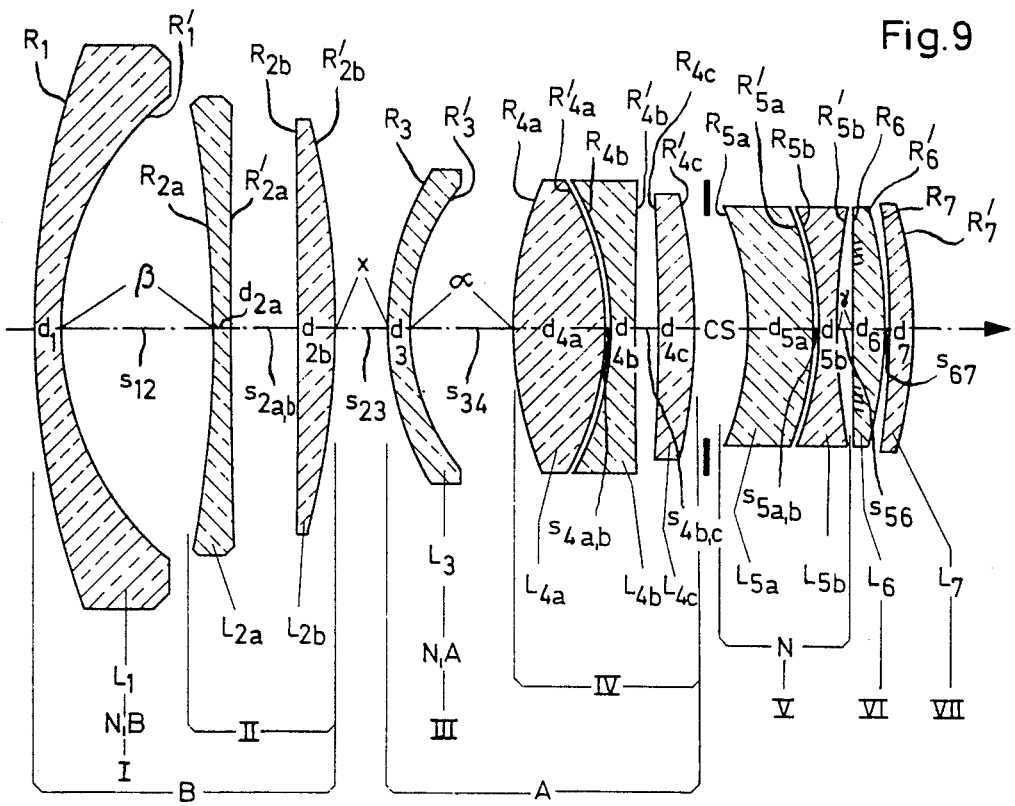

$F = 1.0000$   $f/2.1$   (FIG. 9) $2\omega_e = 77°$   $s_{x'}' = + 1.3449\ F$

| Member | Lens | Radii | Thicknesses and Spacings | $n_d$ | Des. |
|---|---|---|---|---|---|
| I | $L_1$ | $R_1 = + 2.5000$ | $d_1 = 0.0850$ | $n_1 = 1.7170$ | N.B |
|   |   | $R_1' = + 0.9100$ | $s_{12} = 0.4750$ | $(\beta)$ |   |
| II | $L_{2a}$ | $R_{2a} = - 3.2000$ | $d_{2a} = 0.1713$ | $n_{2a} = 1.7130$ | B |
|   |   | $R_{2a}' = - 2.5000$ | $s_{2a.b} = 0.2000$ |   |   |
|   | $L_{2b}$ | $R_{2b} = - 2.5000$ | $d_{2b} = 0.1409$ | $n_{2b} = 1.7880$ |   |
|   |   | $R_{2b}' = - 2.1000$ | $s_{23} = 0.1890$ | $(x)$ |   |
| III | $L_3$ | $R_3 = + 0.9100$ | $d_3 = 0.0708$ | $n_3 = 1.7880$ | N.A |
|   |   | $R_3' = + 0.6690$ | $s_{34} = 0.3255$ | $(\alpha)$ |   |
| IV | $L_{4a}$ | $R_{4a} = + 1.0670$ | $d_{4a} = 0.3050$ | $n_{4a} = 1.7440$ |   |
|   |   | $R_{4a}' = - 0.9100$ | $s_{4a.b} = 0$ |   | A |
|   | $L_{4b}$ | $R_{4b} = - 0.9100$ | $d_{4b} = 0.0790$ | $n_{4b} = 1.5800$ |   |
|   |   | $R_{4b}' = + 15.000$ | $s_{4b.c} = 0.0754$ |   |   |
|   | $L_{4c}$ | $R_{4c} = - 6.8850$ | $d_{4c} = 0.1080$ | $n_{4c} = 1.5700$ |   |
|   |   | $R_{4c}' = - 1.9550$ |   |   |   |
|   |   |   | $CS = 0.1706$ |   |   |
| V | $L_{5a}$ | $R_{5a} = - 0.9920$ | $d_{5a} = 0.2230$ | $n_{5a} = 1.7330$ |   |
|   |   | $R_{5a}' = - 1.0670$ | $s_{5a.b} = 0$ |   | N |
|   | $L_{5b}$ | $R_{5b} = - 1.0670$ | $d_{5b} = 0.0600$ | $n_{5b} = 1.8230$ |   |
|   |   | $R_{5b}' = + 2.0880$ | $s_{56} = 0.0500$ | $(\tau)$ |   |
| VI | $L_6$ | $R_6 = + 26.909$ | $d_6 = 0.1100$ | $n_6 = 1.7880$ |   |
|   |   | $R_6' = - 1.2070$ |   |   |   |

Example 15-continued

| | | | (FIG. 9) | | |
|---|---|---|---|---|---|
| F = 1.0000 | | f/2.1 | $2\omega_o = 77°$ | $s_\infty' = +1.3449\, F$ | |
| Member | Lens | Radii | Thicknesses and Spacings | $n_d$ | Des. |
| VII | $L_7$ | $R_7 = -3.0040$<br>$R_7' = -1.06197$ | $s_{67} = 0.0015$<br>$d_7 = 0.1010$ | $n_7 = 1.7880$ | |

Example 16

| | | | (FIG. 9) | | |
|---|---|---|---|---|---|
| F = 1.0000 | | f/2.1 | $2\omega_o = 78°$ | $s_\infty' = +1.3451\, F$ | |
| Member | Lens | Radii | Thicknesses and Spacings | $n_d$ | Des. |
| I | $L_1$ | $R_1 = +2.5000$<br>$R_1' = +0.9100$ | $d_1 = 0.0850$<br>$s_{12} = 0.4750$ | $n_1 = 1.7170$<br>$(\beta)$ | N,B |
| II | $L_{2a}$ | $R_{2a} = -3.5000$<br>$R_{2a}' = +159.00$ | $d_{2a} = 0.0600$<br>$s_{2a,b} = 0.2100$ | $n_{2a} = 1.6210$ | B |
| | $L_{2b}$ | $R_{2b} = -26.909$<br>$R_{2b}' = -2.4000$ | $d_{2b} = 0.1200$<br>$s_{23} = 0.1636$ | $n_{2b} = 1.7880$<br>$(x)$ | |
| III | $L_3$ | $R_3 = +0.9097$<br>$R_3' = +0.6690$ | $d_3 = 0.0708$<br>$s_{34} = 0.32548$ | $n_3 = 1.7880$<br>$(\alpha)$ | N,A |
| IV | $L_{4a}$ | $R_{4a} = +1.0670$<br>$R_{4a}' = -0.9097$ | $d_{4a} = 0.3050$<br>$s_{4a,b} = 0$ | $n_{4a} = 1.7440$ | A |
| | $L_{4b}$ | $R_{4b} = -0.9097$<br>$R_{4b}' = +15.900$ | $d_{4b} = 0.0790$<br>$s_{4b,c} = 0.0754$ | $n_{4b} = 1.5800$ | |
| | $L_{4c}$ | $R_{4c} = -6.8850$<br>$R_{4c}' = -1.9550$ | $d_{4c} = 0.1080$<br>$CS = 0.1706$ | $n_{4c} = 1.5700$ | |
| V | $L_{5a}$ | $R_{5a} = -0.9920$<br>$R_{5a}' = -1.0670$ | $d_{5a} = 0.2230$<br>$s_{5a,b} = 0$ | $n_{5a} = 1.7330$ | N |
| | $L_{5b}$ | $R_{5b} = -1.0670$<br>$R_{5b}' = +2.0880$ | $d_{5b} = 0.0600$<br>$s_{56} = 0.0500$ | $n_{5b} = 1.8230$<br>$(\tau)$ | |
| VI | $L_6$ | $R_6 = +26.909$<br>$R_6' = -1.2070$ | $d_6 = 0.1100$<br>$s_{67} = 0.0010$ | $n_6 = 1.7880$ | |
| VII | $L_7$ | $R_7 = -3.0040$<br>$R_7' = -1.06212$ | $d_7 = 0.09591$ | $n_7 = 1.7880$ | |

Example 17

Figure 10:
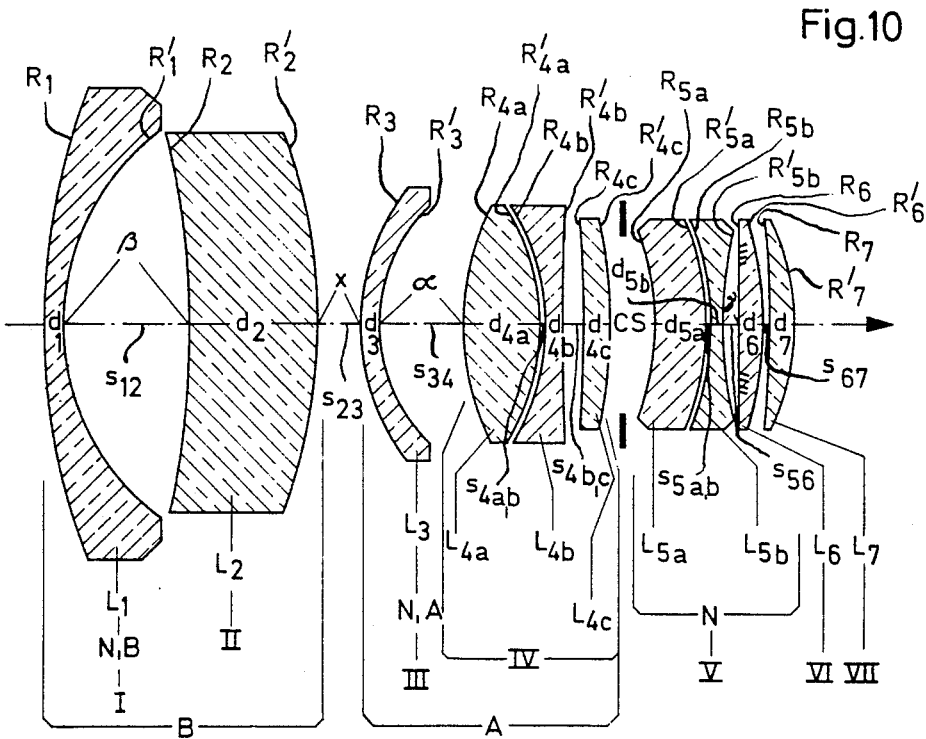

| | | | (FIG. 10) | | |
|---|---|---|---|---|---|
| F = 1.0000 | | f/2.1 | $2\omega_o = 77°$ | $s_\infty' = +1.3448\, F$ | |
| Member | Lens | Radii | Thicknesses and Spacings | $n_d$ | Des. |
| I | $L_1$ | $R_1 = +2.5188$<br>$R_1' = +0.9116$ | $d_1 = 0.08471$<br>$s_{12} = 0.47714\ (\beta)$ | $n_1 = 1.713$ | N,B |
| II | $L_2$ | $R_2 = -3.1396$<br>$R_2' = -2.1185$ | $d_2 = 0.49928$<br>$s_{23} = 0.17260\ (x)$ | $n_2 = 1.717$ | B |
| III | $L_3$ | $R_3 = +0.8843$ | $d_3 = 0.07010$ | $n_3 = 1.788$ | N,A |

Example 17-continued

| F = 1.0000 | | f/2.1 | (FIG. 10) $2\omega_o = 77°$ Thicknesses and | | $s_\infty' = + 1.3448$ F | |
|---|---|---|---|---|---|---|
| Member | Lens | Radii | Spacings | $n_d$ | Des. | |

| Member | Lens | Radii | Spacings | $n_d$ | Des. |
|---|---|---|---|---|---|
| | | $R_3' = + 0.6547$ | | | |
| | | | $s_{34} = 0.32675\ (\alpha)$ | | |
| | $L_{4a}$ | $R_{4a} = + 1.0664$ | $d_{4a} = 0.31445$ | $n_{4a} = 1.744$ | |
| | | $R_{4a}' = - 0.8614$ | $s_{4a.b} = 0$ | | |
| IV | $L_{4b}$ | $R_{4b} = - 0.8614$ | $d_{4b} = 0.06994$ | $n_{4b} = 1.580$ | A |
| | | $R_{4b}' = + 12.562$ | $s_{4b.c} = 0.07663\ (\alpha')$ | | |
| | $L_{4c}$ | $R_{4c} = - 6.8940$ | $d_{4c} = 0.10818$ | $n_{4c} = 1.570$ | |
| | | $R_{4c}' = - 1.9554$ | | | |
| | | | CS = 0.17054 | | |
| | $L_{5a}$ | $R_{5a} = - 0.9923$ | $d_{5a} = 0.22051$ | $n_{5a} = 1.733$ | |
| V | | $R_{5a}' = - 1.0094$ | $s_{5a.b} = 0$ | | N |
| | $L_{5b}$ | $R_{5b} = - 1.0094$ | $d_{5b} = 0.05405$ | $n_{5b} = 1.823$ | |
| | | $R_{5b}' = + 2.1121$ | $s_{56} = 0.05038\ (\gamma)$ | | |
| VI | $L_6$ | $R_6 = + 26.881$ | $d_6 = 0.10941$ | $n_6 = 1.788$ | |
| | | $R_6' = - 1.2075$ | $s_{67} = 0.00191$ | | |
| VII | $L_7$ | $R_7 = - 3.0060$ | $d_7 = 0.10319$ | $n_7 = 1.788$ | |
| | | $R_7' = - 1.061803$ | | | |

Example 18

Figure 11:
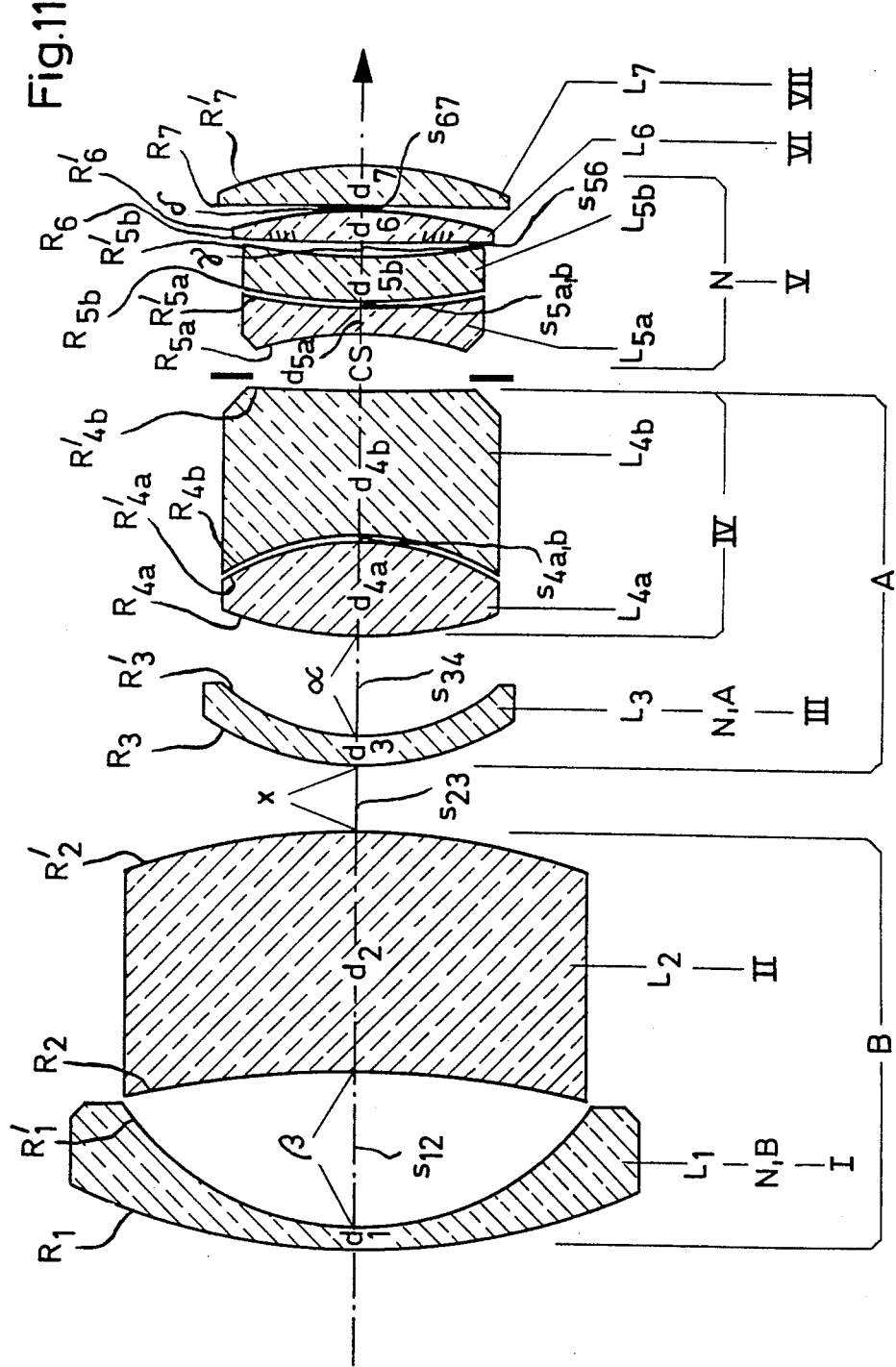

| F = 1.0000 | | f/2.1 | (FIG. 11) $2\omega_o = 78°$ Thicknesses and | | $s_\infty' = + 1.3448$ F | |
|---|---|---|---|---|---|---|
| Member | Lens | Radii | Spacings | $n_d$ | Des. | |

| Member | Lens | Radii | Spacings | $n_d$ | Des. |
|---|---|---|---|---|---|
| I | $L_1$ | $R_1 = + 2.3064$ | $d_1 = 0.07701$ | $n_1 = 1.713$ | N,B |
| | | $R_1' = + 0.9426$ | | | |
| | | | $s_{12} = 0.49715\ (\beta)$ | | B |
| II | $L_2$ | $R_2 = - 3.4587$ | $d_2 = 0.78358$ | $n_2 = 1.713$ | |
| | | $R_2' = - 2.2496$ | | | |
| | | | $s_{23} = 0.21166\ (x)$ | | |
| III | $L_3$ | $R_3 = + 0.9193$ | $d_3 = 0.08810$ | $n_3 = 1.788$ | N,A |
| | | $R_3' = + 0.6650$ | | | |
| | | | $s_{34} = 0.32940\ (\alpha)$ | | |
| | $L_{4a}$ | $R_{4a} = + 1.2190$ | $d_{4a} = 0.31840$ | $n_{4a} = 1.744$ | A |
| IV | | $R_{4a}' = - 0.8460$ | $s_{4a.b} = 0$ | | |
| | $L_{4b}$ | $R_{4b} = - 0.8460$ | $d_{4b} = 0.48710$ | $n_{4b} = 1.534$ | |
| | | $R_{4b}' = + 7.7566$ | | | |
| | | | CS = 0.18320 | | |
| | $L_{5a}$ | $R_{5a} = - 1.2750$ | $d_{5a} = 0.10800$ | $n_{5a} = 1.945$ | |
| V | | $R_{5a}' = + 3.2550$ | $s_{5a.b} = 0$ | | N |
| | $L_{5b}$ | $R_{5b} = + 3.2550$ | $d_{5b} = 0.16275$ | $n_{5b} = 1.714$ | |
| | | $R_{5b}' = + 2.8504$ | | | |
| | | | $s_{56} = 0.03215\ (\gamma)$ | | |
| VI | $L_6$ | $R_6 = + 9.5750$ | $d_6 = 0.12210$ | $d_6 = 1.788$ | |
| | | $R_6' = - 1.3950$ | $s_{67} = 0.00215\ (\delta)$ | | |
| VII | $L_7$ | $R_7 = - 11.579$ | $d_7 = 0.13515$ | $d_7 = 1.788$ | |

Example 18-continued

| | | | (FIG. 11) | |
|---|---|---|---|---|
| F = 1.0000 | | f/2.1 | $2\omega_e = 78°$ | $s_\infty' = + 1.3448\ F$ |
| | | | Thicknesses and | |
| Member | Lens | Radii | Spacings | $n_d$    Des. |

$R_7' = - 1.241121$

Example 19

Figure 12:
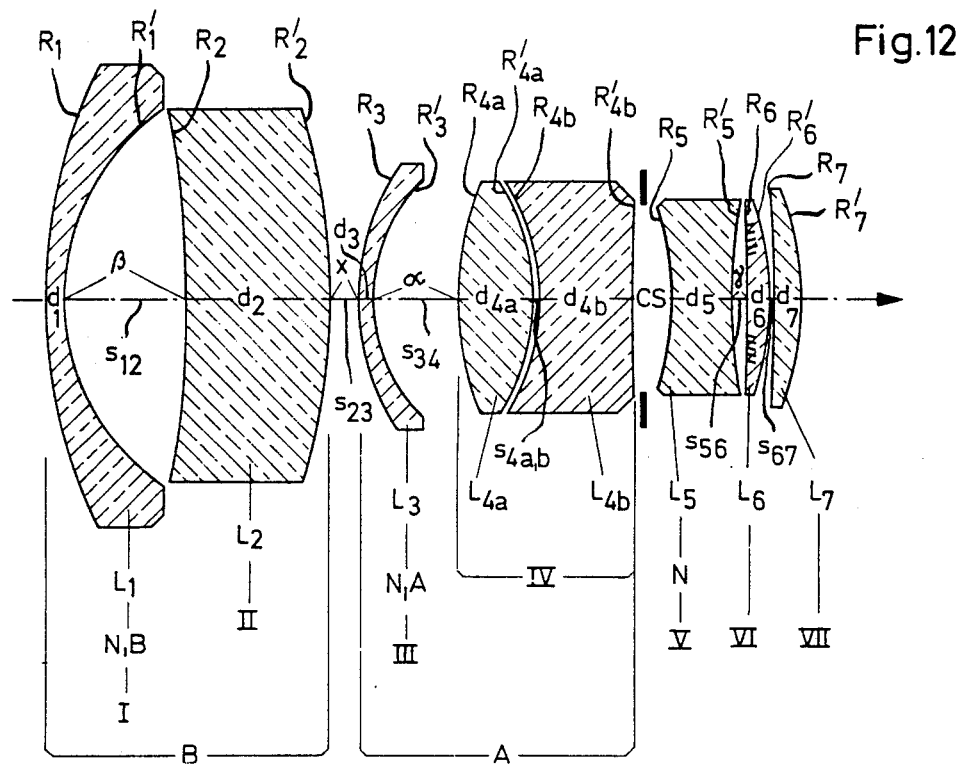

| | | | (FIG. 12) | |
|---|---|---|---|---|
| F = 1.0000 | | f/2.0 | $2\omega_e = 79°$ | $s_\infty' = + 1.3448\ F$ |
| | | | Thicknesses and | |
| Member | Lens | Radii | Spacings | $n_d$    Des. |

| Member | Lens | Radii | Thicknesses and Spacings | $n_d$ | Des. |
|---|---|---|---|---|---|
| I | $L_1$ | $R_1 = + 2.0000$<br>$R_1' = + 0.8710$ | $d_1 = 0.07105$ | $n_1 = 1.7130$ | N.B |
| | | | $s_{12} = 0.46680\ (\beta)$ | | B |
| II | $L_2$ | $R_2 = - 3.4960$<br>$R_2' = - 2.2585$ | $d_2 = 0.56105$ | $n_2 = 1.7360$ | |
| | | | $s_{23} = 0.10480\ (x)$ | | |
| III | $L_3$ | $R_3 = + 0.8707$<br>$R_3' = + 0.6334$ | $d_3 = 0.06380$ | $n_3 = 1.7883$ | N.A |
| | | | $s_{34} = 0.32350\ (\alpha)$ | | |
| IV | $L_{4a}$ | $R_{4a} = + 1.1119$<br>$R_{4a}' = - 0.8265$ | $d_{4a} = 0.29585$<br>$s_{4a,b} = 0$ | $n_{4a} = 1.7440$ | A |
| | $L_{4b}$ | $R_{4b} = - 0.8265$<br>$R_{4b}' = + 16.158$ | $d_{4b} = 0.39045$ | $n_{4b} = 1.5403$ | |
| | | | $CS = 0.14620$ | | |
| V | $L_5$ | $R_5 = - 1.1119$<br>$R_5' = + 2.4908$ | $d_5 = 0.24130$ | $n_5 = 1.9050$ | N |
| | | | $s_{56} = 0.03400\ (\gamma)$ | | |
| VI | $L_6$ | $R_6 = + 25.097$<br>$R_6' = - 1.1825$ | $d_6 = 0.10320$<br>$s_{67} = 0.00200$ | $n_6 = 1.7883$ | |
| VII | $L_7$ | $R_7 = - 7.0710$<br>$R_7' = - 1.1209$ | $d_7 = 0.11455$ | $n_7 = 1.7883$ | |

Example 20

Figure 13:
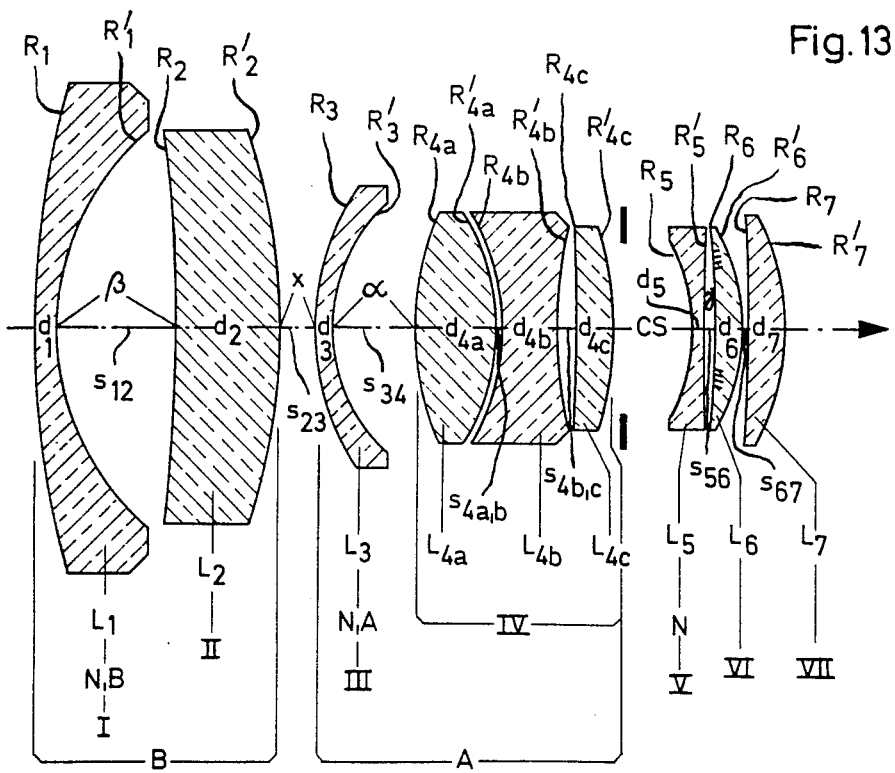

| | | | (FIG. 13) | |
|---|---|---|---|---|
| F = 1.0000 | | f/2.0 | $2\omega_e = 79°$ | $s_\infty' = + 1.3601\ F$ |
| | | | Thicknesses and | |
| Member | Lens | Radii | Spacings | $n_d/\nu_d$    Des. |

| Member | Lens | Radii | Thicknesses and Spacings | $n_d/\nu_d$ | Des. |
|---|---|---|---|---|---|
| I | $L_1$ | $R_1 = + 3.69309$<br>$R_1' = + 0.99881$ | $d_1 = 0.085974$ | 1.71300/53.85 | N.B |
| | | | $s_{12} = 0.450561\ (\beta)$ | | B |
| II | $L_2$ | $R_2 = - 5.49747$<br>$R_2' = - 2.24026$ | $d_2 = 0.396119$ | 1.69895/30.06 | |
| | | | $s_{23} = 0.141720\ (x)$ | | |
| III | $L_3$ | $R_3 = + 0.93354$<br>$R_3' = + 0.63618$ | $d_3 = 0.067124$ | 1.78831/47.37 | N.A |
| | | | $s_{34} = 0.320987\ (\alpha)$ | | |
| | $L_{4a}$ | $R_{4a} = + 1.06005$<br>$R_{4a}' = - 0.79246$ | $d_{4a} = 0.318496$ | 1.74400/44.77 | A |

Example 20-continued

| | | | (FIG. 13) $2\omega_o = 79°$ | | |
|---|---|---|---|---|---|
| $F = 1.0000$ | | f/2.0 | Thicknesses and | $s_m' = +1.3601\ F$ | |
| Member | Lens | Radii | Spacings | $n_d/\nu_d$ | Des. |

| Member | Lens | Radii | Spacings | $n_d/\nu_d$ | Des. |
|---|---|---|---|---|---|
| IV | $L_{4b}$ | $R_{4b} = -0.79246$ | $s_{4a,b} = 0$ | | |
| | | $R_{4b}' = +1.77608$ | $d_{4b} = 0.245433$ | 1.60342/38.02 | |
| | | | $s_{4b,c} = 0.070917$ | | |
| | $L_{4c}$ | $R_{4c} = -6.91419$ | $d_{4c} = 0.137889$ | 1.71700/47.99 | |
| | | $R_{4c}' = -1.53242$ | | | |
| | | | $CS = 0.310259$ | | |
| V | $L_5$ | $R_5 = -0.65771$ | $d_5 = 0.049539$ | 1.80518/25.43 | N |
| | | $R_5' = +97.41345$ | | | |
| | | | $s_{56} = 0.034750\ (\gamma)$ | | |
| VI | $L_6$ | $R_6 = -3.57110$ | $d_6 = 0.116893$ | 1.63854/55.38 | |
| | | $R_6' = -0.78609$ | | | |
| | | | $s_{67} = 0.008084$ | | |
| VII | $L_7$ | $R_7 = -4.64307$ | $d_7 = 0.153137$ | 1.78831/47.37 | |
| | | $R_7' = -0.90940$ | | | |

Example 21

| | | | (FIG. 13) $2\omega_o = 80°$ | | |
|---|---|---|---|---|---|
| $F = 1.0000$ | | f/2.0 | Thicknesses and | $S_m' = +1.3907\ F$ | |
| Member | Lens | Radii | Spacings | $n_d/\nu_d$ | Des. |

| Member | Lens | Radii | Spacings | $n_d/\nu_d$ | Des. |
|---|---|---|---|---|---|
| I | $L_1$ | $R_1 = +4.89012$ | $d_1 = 0.085099$ | 1.71300/53.85 | N,B |
| | | $R_1' = +1.09793$ | | | |
| | | | $s_{12} = 0.354786\ (\beta)$ | | B |
| II | $L_2$ | $R_2 = +15.69091$ | $d_2 = 0.425843$ | 1.69895/30.06 | |
| | | $R_2' = -3.02092$ | | | |
| | | | $s_{23} = 0.002124\ (x)$ | | |
| III | $L_3$ | $R_3 = +1.19673$ | $d_3 = 0.160708$ | 1.78831/47.37 | N,A |
| | | $R_3' = +0.60664$ | | | |
| | | | $s_{34} = 0.299594\ (\alpha)$ | | |
| IV | $L_{4a}$ | $R_{4a} = +1.07641$ | $d_{4a} = 0.324029$ | 1.74400/44.77 | A |
| | | $R_{4a}' = -0.74046$ | | | |
| | | | $s_{4a,b} = 0$ | | |
| | $L_{4b}$ | $R_{4b} = -0.74046$ | $d_{4b} = 0.346817$ | 1.60342/38.02 | |
| | | $R_{4b}' = +2.68377$ | | | |
| | | | $s_{4b,c} = 0.068552$ | | |
| | $L_{4c}$ | $R_{4c} = -2.24088$ | $d_{4c} = 0.094884$ | 1.71700/47.99 | |
| | | $R_{4c}' = -1.03112$ | | | |
| | | | $CS = 0.251910$ | | |
| V | $L_5$ | $R_5 = -0.59687$ | $d_5 = 0.036333$ | 1.80518/25.43 | N |
| | | $R_5' = -12.68244$ | | | |
| | | | $s_{56} = 0.032165\ (\gamma)$ | | |
| VI | $L_6$ | $R_6 = -2.68675$ | $d_6 = 0.119173$ | 1.63854/55.38 | |
| | | $R_6' = -0.73659$ | | | |
| | | | $s_{67} = 0.002336$ | | |
| VII | $L_7$ | $R_7 = -4.98373$ | $d_7 = 0.165864$ | 1.78831/47.37 | |
| | | $R_7' = -0.85877$ | | | |

In the foregoing seven examples 15–21 there is indicated for the aspherical surface with the radius of curvature $R_6$ the zenith radius of this deformed lens surface at the point of intersection with the optical axis. The shape of the surface to the side of this axial locus is given in known manner by the formula $$P = c_1.H^2 + c_2.H^4 + \ldots + c_5.H^{10}$$

In this formula, P is the depth of camber of the surface intersection locus for the coefficients height H normal to the axis. For the coefficients $c_1$ in these examples, there is fundamentally the expression $$c_1 = (2.R_6)^{-1}$$

and therefore $c_1$ is equal to the reciprocal of twice the vertex radius $R_6$ of each of these deformed surfaces.

The values of the other coefficients $c_2$, $c_3$, etc., can be noted for these embodiments from the following table:

| Example | $c_2$ | $c_3$ | $c_4$ | $c_5$ |
|---|---|---|---|---|
| 15 | $-1.645779 \cdot 10^{-1}$ | 0 | 0 | 0 |
| 16 | $-1.645779 \cdot 10^{-1}$ | 0 | 0 | 0 |
| 17 | $-1.645779 \cdot 10^{-1}$ | 0 | 0 | 0 |
| 18 | $-1.360417 \cdot 10^{-1}$ | 0 | 0 | 0 |
| 19 | $-1.428147 \cdot 10^{-1}$ | 0 | 0 | 0 |
| 20 | $-2.853254 \cdot 10^{-1}$ | 0 | 0 | 0 |

In example 21, the respective coefficients are $$c_2 = -3.343118 \cdot 10^{-1}$$

$$c_3 = +4.551811 \cdot 10^{-2}$$

The foregoing remarks and explanations apply particularly to the forms of the invention substantially in accordance with the foregoing examples 1–21 and illustrated schematically in FIGS. 1–13 of the drawings. A further development of the same basic concept is possible, and will now be disclosed particularly with reference to FIGS. 14 and 15 of the drawings, and the following examples 22–27.

According to this further developent of the invention, a particularly advantageous objective or lens system with a large angular field can be constructed, while avoiding extreme types of glass and extreme shapes of surfaces, yet providing a definite reduction of the zonal residual errors in the finitely opened ray beams passing through the objective having both medium and also very strong inclinations of these beams with respect to the optical axis, therefore providing both for a medium and for a very large anular field utilization. This is accomplished, according to the present further development of the basic invention, in the mannner that for the present subspecies of a high speed objective with large angular field, there is a change in the regional positions of the design rules set forth above with respect to examples 1–21, and the ratio of the collecting air-lens power $\phi_x$ relative to the surface power sums of the two negative meniscuses I and III in the members or groups B and A, respectively, is reduced as compared with the rules above stated for examples 1–21.

The quotient $Q_a$ of the air-lens power $\phi_x$ divided by the sum of the paraxial surface powers $\phi_S$ (that is, $\phi_I + \phi_{III}$) has a negative value which is, according to this further development of the invention, in the numerical range between 0.545 and 1.165, rather than the range originally stated for this quotient $Q_a$ above. Moreover, according to this further development of the invention, the quotient $Q_b$ of this air lens power $\phi_x$ divided by the paraxial surface power sum $\phi_I$ of the negative component I is reduced to a value within the range of 1.165 and 2.300, rather than the range of this quotient as first given in connection with examples 1–21.

Moreover, according to this further development of the basic invention, the construction should comply also with the further rule or condition that the positive individual component II arranged behind the front negative component I is fundamentally developed as a meniscus which is convex toward the image, and thus the air space or air lens β between these two components I and II of group B always has the external shape of a biconvex lens with legs of unequal length. Thus the proportion ($Q_a$, $Q_b$) of the air lens power relative to the expressions of the area power sums of these meniscus shaped negative lenses is definitely reduced, in order to obtain an increased balancing out of these refractive power sums. The specific development of these two refractive power relations during the course of the present further development of the basic invention will become clearly evident to the person skilled in the art, after such person receives the disclosure of the present invention concept, if it is borne in mind that, particularly in the case of objectives of very large angle, these two relationships of the dioptric action on the oblique course of the beam are active at places of very large distance along the path of the beam from the stop.

The specific subspecies of high power objectives of large angular field described above with respect to this further development of the basic invention, establishes the design principle, therefore, that the collecting individual lens component II of the front group B is limited to that meniscus shaped form in which its two outer radii adjoining the air have the same sign, this being a negative sign on account of these surfaces both being concave toward the front and convex toward the rear, so that this component II is shaped as a positive meniscus. An inventive concept of this further development of the basic invention, for the successful solution of the problem, can now be seen to reside in the fact that simultaneously with this meniscus shape of the individual component II, the paraxial characteristic focal length $f_z$ of the first three individual lens components I and II and III, collectively referred to as the front diverging combination Z, has a negative sign, and at the same time has a negative value within the limits of 0.655 F and 1.085 F.

The optical importance of this last mentioned rule or condition for the overall combination will be easily understood by a person skilled in the art after knowledge of the above disclosure, if it is borne in mind when analyzing the present disclosure that if one goes below the above mentioned negative minimum limit, then in the following individual components of the overall objective there will be an accumulation of positive powers of refraction which are too strong to obtain, for the objective as a whole, a high speed by assuring the realization of the focal length unit F = +1 for the entire objective. Such an accumulation of excessively strong positive powers in the remaining part of the lens system would then lead to too great an increase in the aberrations of higher order and thus of the zonal intermediate errors in the finitely opened beams in the central area of the image as well as in the abaxial area. On the other hand, if the above stated negative upper limit of dimensioning is exceeded, then there willl also be a corresponding increase in the aberrations in the production of the image, the elimination of which would be possible in known manner, but would lead to unfavorable interrelationship between the structural length and the back focus.

A further part of the present development of the basic invention resides in the fact that the incurvature of the individual lens member II enclosed within the combination of lens components I, II, and III, collectively referred to as the group Z, is to be developed as a particularly strongly incurvated meniscus, in such manner that its Gardner incurvation number ($\sigma_{II}$) is so dimensioned that it is in the range or between the limits of −6.8 and −11.4, the negative sign of this value meaning that the rear outer surface which faces the rear of the lens system is provided with a much deeper curvature than the front outer surface. In this connection reference may be had to the above mentioned publication of I. C. Gardner, Bureau of Standards Scientific Paper no. 550, pages 82 and 83.

In the following data tables, six examples of the invention according to the above discussion of the further development of the basic concept, are given and are identified as examples 22–27. In all of these, just as in the previously discussed examples 1–21, all linear dimensions are given with reference to the equivalent focal length of the entire lens system, which is considered as unity. The various notations have the same meanings already explained in connection with the earlier examples. The earlier remarks with respect to the index of refraction and the index of dispersion or Abbe number, apply also to the further examples 22–27 constituting a further development of the basic concept. For the sake of completeness of disclosure, the examples are followed by numerical compilations of certain individual features of the invention.

Example 22

$F = 1.0000$ (FIG. 14) $f/2.9$ $2\omega_o = 71°$ $s_\infty' = +1.3529 \; F$

| Member | Lens | Radii | Thicknesses and Spacings | Glass Des. |
|---|---|---|---|---|
| I | $L_1$ | $R_1 = +1.65457$ <br> $R_1' = +0.67164$ | $d_1 = 0.062195$ | $n_1$ N.B |
|  |  |  | $s_{12} = 0.403965 \; (\beta)$ | B |
| II | $L_2$ | $R_2 = -3.40474$ <br> $R_2' = -1.85987$ | $d_2 = 0.303440$ | $n_2$ |
|  |  |  | $s_{23} = 0.055437 \; (x)$ |  |
| III | $L_3$ | $R_3 = +1.33577$ <br> $R_3' = +0.49478$ | $d_3 = 0.039787$ | $n_3$ N.A |
|  |  |  | $s_{34} = 0.227711 \; (\alpha)$ |  |
| IV | $L_{4a}$ | $R_{4a} = +0.85798$ <br> $R_{4a}' = +3.45524$ | $d_{4a} = 0.79477$ <br> $s_{4a.b} = 0.147730$ | $n_{4a}$ A |
|  | $L_{4b}$ | $R_{4b} = +1.65951$ <br> $R_{4b}' = -1.00365$ | $d_{4b} = 0.240255$ | $n_{4b}$ |
|  |  |  | $CS = s_{45} = 0.106584$ |  |
| V | $L_5$ | $R_5 = -0.81464$ <br> $R_5' = 1.57510$ | $d_5 = 0.087768$ <br> $+ 1.17984$ | $n_5$ N |
|  |  |  | $s_{56} = 0.053185 \; (\gamma)$ |  |
| VI | $L_{6a}$ | $R_{6a} = -1.89577$ | $d_{6a} = 0.036428$ <br> $R_{6a}' = +0.81520$ <br> $s_{6a.b} = 0$ | $n_{6a}$ |
|  | $L_{6b}$ | $R_{6b} = +0.81520$ <br> $R_{6b}' = -0.67026$ | $d_{6b} = 0.130001$ | $n_{6b}$ |
|  |  |  | $s_{67} = 0.002175$ |  |
| VII | $L_7$ | $R_7 = -6.32765$ <br> $R_7' = -1.19479$ | $d_7 = 0.074370$ | $n_7$ |

Example 23

(FIG. 14)
F = 1.0000    f/2.8    $2\omega_o = 73°$    $s_m' = +1.3547\ F$

Thicknesses and Spacings

| Member | Lens | Radii | Thicknesses and Spacings | Glass | Des. |
|---|---|---|---|---|---|
| I | $L_1$ | $R_1 = +1.91258$ | $d_1 = 0.061001$ | $n_1$ | N,B |
|  |  | $R_1' = +0.67632$ |  |  |  |
|  |  |  | $s_{12} = 0.325923\ (\beta)$ |  |  |
| II | $L_2$ | $R_2 = -1.72515$ | $d_2 = 0.354358$ | $n_2$ |  |
|  |  | $R_2' = -1.35142$ |  |  |  |
|  |  |  | $s_{23} = 0.176911\ (x)$ |  |  |
| III | $L_3$ | $R_3 = +0.96714$ | $d_3 = 0.088581$ | $n_3$ | N,A |
|  |  | $R_3' = +0.59037$ |  |  |  |
|  |  |  | $s_{34} = 0.237079\ (\alpha)$ |  |  |
| IV | $L_{4a}$ | $R_{4a} = +0.87800$ | $d_{4a} = 0.109338$ | $n_{4a}$ |  |
|  |  | $R_{4a}' = +3.11418$ |  |  |  |
|  |  |  | $s_{4a,b} = 0.131277$ |  |  |
|  | $L_{4b}$ | $R_{4b} = +1.09391$ | $d_{4b} = 0.126153$ | $n_{4b}$ |  |
|  |  | $R_{4b}' = -1.36081$ |  |  |  |
|  |  |  | $CS = s_{45} = 0.093002$ |  |  |
| V | $L_5$ | $R_5 = -0.93251$ | $d_5 = 0.157181$ | $n_5$ | N |
|  |  | $R_5' = +0.86196$ |  |  |  |
|  |  |  | $s_{56} = 0.055386\ (\gamma)$ |  |  |
| VI | $L_{6a}$ | $R_{6a} = -5.54140$ | $d_{6a} = 0.036662$ | $n_{6a}$ |  |
|  |  | $R_{6a}' = +0.66140$ |  |  |  |
|  |  |  | $s_{6a,b} = 0$ |  |  |
|  | $L_{6b}$ | $R_{6b} = +0.66140$ | $d_{6b} = 0.133165$ | $n_{6b}$ |  |
|  |  | $R_{6b}' = -0.73466$ |  |  |  |
|  |  |  | $s_{67} = 0.002002$ |  |  |
| VII | $L_7$ | $R_7 = -11.12371$ | $d_7 = 0.066729$ | $n_7$ |  |
|  |  | $R_7' = -1.57510$ |  |  |  |

Example 24

(FIG. 14)
F = 1.0000    f/2.7    $2\omega_o = 73.5°$    $s_m' = +1.3558\ F$

Thicknesses and Spacings

| Member | Lens | Radii | Thicknesses and Spacings | Glass | Des. |
|---|---|---|---|---|---|
| I | $L_1$ | $R_1 = +1.62159$ | $d_1 = 0.63046$ | $n_1$ | N,B |
|  |  | $R_1' = +0.64757$ |  |  |  |
|  |  |  | $s_{12} = 0.362879\ (\beta)$ |  |  |
| II | $L_2$ | $R_2 = -1.64088$ | $d_2 = 0.236511$ | $n_2$ |  |
|  |  | $R_2' = -1.31742$ |  |  |  |
|  |  |  | $s_{23} = 0.118200\ (x)$ |  |  |
| III | $L_3$ | $R_3 = +1.71672$ | $d_3 = 0.065687$ | $n_3$ | N,A |
|  |  | $R_3' = +0.66370$ |  |  |  |
|  |  |  | $s_{34} = 0.252496\ (\alpha)$ |  |  |
| IV | $L_{4a}$ | $R_{4a} = +1.02061$ | $d_{4a} = 0.114153$ | $n_{4a}$ |  |
|  |  | $R_{4a}' = +7.24185$ |  |  |  |
|  |  |  | $s_{4a,b} = 0.086283$ |  |  |
|  | $L_{4b}$ | $R_{4b} = +1.01327$ | $d_{4b} = 0.323684$ | $n_{4b}$ |  |
|  |  | $R_{4b}' = -1.31283$ |  |  |  |
|  |  |  | $CS = s_{45} = 0.095864$ |  |  |
| V | $L_5$ | $R_5 = 0.82499$ | $d_5 = 0.099192$ | $n_5$ | N |
|  |  | $R_5' = +0.92996$ |  |  |  |
|  |  |  | $s_{56} = 0.050803\ (\gamma)$ |  |  |

Figure 14:
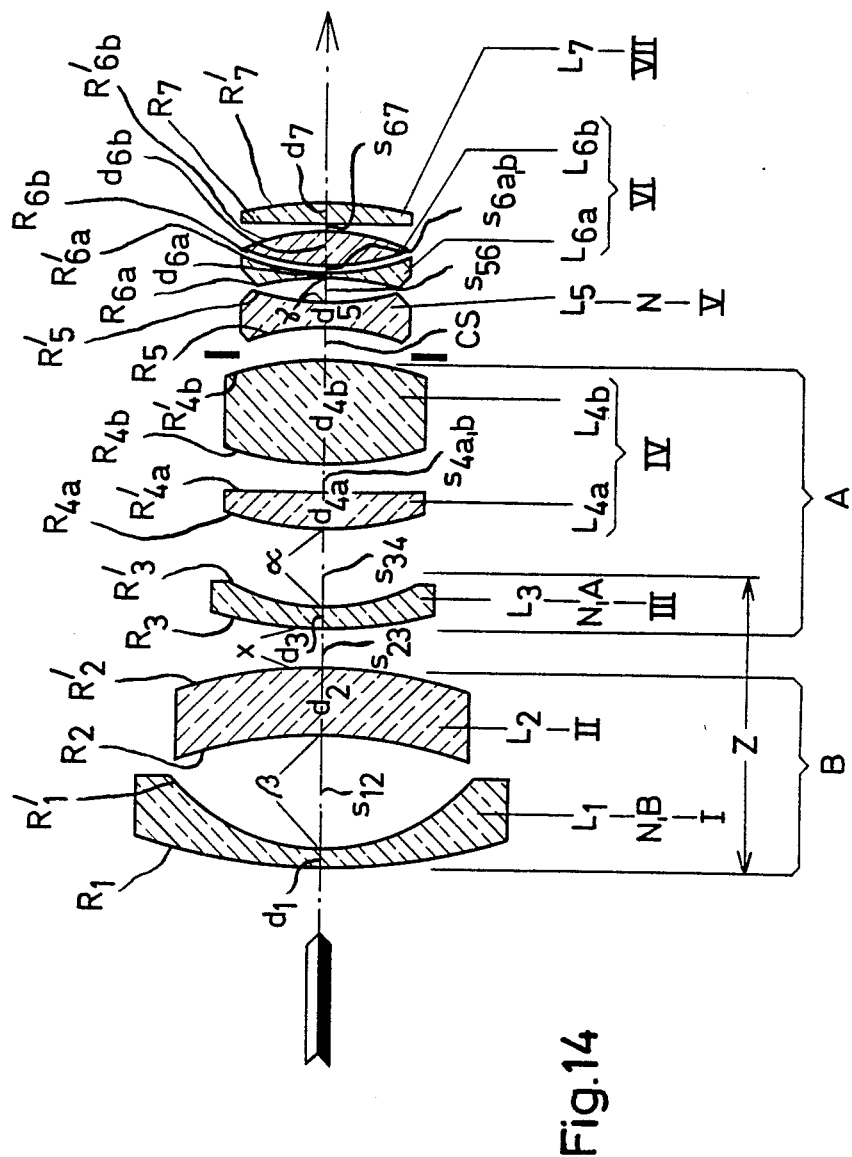

Example 24-continued (FIG. 14)

| | | F = 1.0000 | f/2.7 | $2\omega_o = 73.5°$ | | $s_\infty' = +1.3558\ F$ |
|---|---|---|---|---|---|---|
| Member | Lens | Radii | | Thicknesses and Spacings | Glass | Des. |
| VI | $L_{6a}$ | $R_{6a} = -7.45722$ | | $d_{6a} = 0.037581$ | $n_{6a}$ | |
| | | $R_{6a}' = +0.67390$ | | $s_{6a,b} = 0$ | | |
| | $L_{6b}$ | $R_{6b} = +0.67390$ | | $d_{6b} = 0.134041$ | $n_{6b}$ | |
| | | $R_{6b}' = -0.72708$ | | $s_{67} = 0.002135$ | | |
| VII | $L_7$ | $R_7 = +240.7509$ | | $d_7 = 0.068098$ | $n_7$ | |
| | | $R_7' = -1.62238$ | | | | |

Example 25

(FIG. 15)

| | | F = 1.0000 | f/2.4 | $2\omega_e = 74°$ | | $s_\infty' = +1.2598\ F$ |
|---|---|---|---|---|---|---|
| Member | Lens | Radii | | Thicknesses and Spacings | Glass | Des. |
| I | $L_1$ | $R_1 = +1.9800$ | | $d_1 = 0.0650$ | $n_1$ | |
| | | $R_1' = +0.7900$ | | $s_{12} = 0.3100\ (\beta)$ | | |
| II | $L_2$ | $R_2 = -6.800$ | | $d_2 = 0.2850$ | $n_2$ | |
| | | $R_2' = -3.4000$ | | $s_{23} = 0.0050\ (x)$ | | |
| III | $L_3$ | $R_3 = +1.0000$ | | $d_3 = 0.0650$ | $n_3$ | |
| | | $R_3' = +0.5810$ | | $s_{34} = 0.2700\ (\alpha)$ | | |
| IV | $L_{4a}$ | $R_{4a} = +1.0000$ | | $d_{4a} = 0.1550$ | $n_{4a}$ | |
| | | $R_{4a}' = -5.5000$ | | $s_{4a,b} = 0.1053$ | | |
| | $L_{4b}$ | $R_{4b} = -3.4000$ | | $d_{4b} = 0.1250$ | $n_{4b}$ | |
| | | $R_{4b}' = -1.6300$ | | $s_{4b,c} = 0$ | | |
| | $L_{4c}$ | $R_{4c} = -1.6300$ | | $d_{4c} = 0.1160$ | $n_{4c}$ | |
| | | $R_{4c}' = -1.1460$ | | $s_{45} = 0.0800$ | | |
| V | $L_5$ | $R_5 = +1.1460$ | | $d_5 = 0.0780$ | $n_5$ | |
| | | $R_5' = +1.3200$ | | $s_{56} = CS = 0.1260$ | | |
| VI | $L_6$ | $R_6 = -0.7556$ | | $d_6 = 0.0420$ | $n_6$ | |
| | | $R_6' = +2.1873$ | | $s_{67} = 0.0650\ (\gamma)$ | | |
| VII | $L_7$ | $R_7 = -1.7545$ | | $d_7 = 0.1225$ | $n_7$ | |
| | | $R_7' = -0.6594$ | | $s_{78} = 0.0025$ | | |
| VIII | $L_8$ | $R_8 = +7.0504$ | | $d_8 = 0.1525$ | $n_8$ | |
| | | $R_8' = -1.398065$ | | | | |

Table of Indices of Refraction

| Example 22 | Example 23 | Example 24 | Example 25 |
|---|---|---|---|
| $n_1 = 1.63408$ | $n_1 = 1.66787$ | $n_1 = 1.60680$ | $n_1 = 1.621$ |
| $n_2 = 1.66735$ | $n_2 = 1.57810$ | $n_2 = 1.58011$ | $n_2 = 1.688$ |
| $n_3 = 1.47624$ | $n_3 = 1.74400$ | $n_3 = 1.74400$ | $n_3 = 1.785$ |
| $n_{4a} = 1.74265$ | $n_{4a} = 1.74367$ | $n_{4a} = 1.74065$ | $n_{4a} = 1.744$ |
| $n_{4b} = 1.67291$ | $n_{4b} = 1.68135$ | $n_{4b} = 1.67899$ | $n_{4b} = 1.744$ |
| $n_5 = 1.46415$ | $n_5 = 1.48842$ | $n_5 = 1.49124$ | $n_{4c} = 1.640$ |

-continued
Table of Indices of Refraction

| Example 22 | Example 23 | Example 24 | Example 25 |
|---|---|---|---|
| $n_{6a} = 1.80292$ | $n_{6a} = 1.80031$ | $n_{6a} = 1.80512$ | $n_5 = 1.691$ |
| $n_{6b} = 1.47489$ | $n_{6b} = 1.51009$ | $n_{6b} = 1.51009$ | $n_6 = 1.847$ |
| $n_7 = 1.74334$ | $n_7 = 1.71470$ | $n_7 = 1.70138$ | $n_7 = 1.713$ |
| | | | $n_8 = 1.744$ |

Example 26

(FIG. 14)

F = 1.0000    f/2.8    $2\omega_a = 73°$    $s_\infty' = +1.3481\ F$

| Member | Lens | Radii | Thicknesses and Spacings | Glass | Des. |
|---|---|---|---|---|---|
| I | $L_1$ | $R_1 = +1.67255$ | $d_1 = 0.057943$ | (1) N,B | |
| | | $R_1' = +0.67067$ | $s_{12} = 0.365043\ (\beta)$ | | |
| II | $L_2$ | $R_2 = -1.64866$ | $d_2 = 1.48721$ | (2) | Z |
| | | $R_2' = -1.32856$ | $s_{23} = 0.042492\ (x)$ | | |
| III | $L_3$ | $R_3 = +2.13602$ | $d_3 = 0.049252$ | (3) N,A | |
| | | $R_3' = +0.66107$ | $s_{34} = 0.303236\ (\alpha)$ | | |
| IV | $L_{4a}$ | $R_{4a} = +1.22743$ | $d_{4a} = 0.083052$ | $(4_a)$ | |
| | | $R_{4a}' = -66.53817$ | $s_{4a,b} = 0.090778$ | | A |
| | $L_{4b}$ | $R_{4b} = +1.03274$ | $d_{4b} = 0.461615$ | $(4_b)$ | |
| | | $R_{4b}' = -1.23632$ | $CS = s_{45} = 0.094641$ | | |
| V | $L_5$ | $R_5 = -0.80282$ | $d_5 = 0.066635$ | (5) N | |
| | | $R_5' = +0.99622$ | $s_{56} = 0.048286\ (\gamma)$ | | |
| VI | $L_{6a}$ | $R_{6a} = -8.26213$ | $d_{6a} = 0.036697$ | (6a) | |
| | | $R_{6a}' = +0.66586$ | $s_{6a,b} = 0$ | | |
| | $L_{6b}$ | $R_{6b} = +0.66586$ | $d_{6b} = 0.129407$ | $(6_b)$ | |
| | | $R_{6b}' = -0.75255$ | $s_{67} = 0.001931$ | | |
| VII | $L_7$ | $R_7 = -32.41925$ | $d_7 = 0.065669$ | (7) | |
| | | $R_7' = -1.42766$ | | | |

Example 27

(FIG. 15)

F = 1.0000    f/2    $2\omega_e = 74.5°$    $s_\infty' = +1.2586\ F$

| Member | Lens | Radii | Thicknesses and Spacings | Glass | Des. |
|---|---|---|---|---|---|
| I | $L_1$ | $R_1 = +1.98647$ | $d_1 = 0.064579$ | (1) N,B | B |
| | | $R_1' = +0.79363$ | $s_{12} = 0.310662\ (\beta)$ | | |
| II | $L_2$ | $R_2 = -6.94281$ | $d_2 = 0.286521$ | (2) | Z |
| | | $R_2' = -3.53160$ | $s_{23} = 0.003880\ (x)$ | | |
| III | $L_3$ | $R_3 = +0.97595$ | $d_3 = 0.058213$ | (3) N,A | |
| | | $R_3' = +0.57542$ | $s_{34} = 0.268147\ (\alpha)$ | | |
| IV | $L_{4a}$ | $R_{4a} = +1.02113$ | $d_{4a} = 0.157717$ | $(4_a)$ | |
| | | $R'_{4a} = -3.43523$ | $s_{4a,b} = 0.118089$ | | |
| | $L_{4b}$ | $R_{4b} = -3.44865$ | $d_{4b} = 0.122462$ | $(4_b)$ | A |
| | | $R_{4b}' = -1.62973$ | $s_{4b,c} = 0$ | | |
| | $L_{4c}$ | $R_{4c} = -1.62973$ | $d_{4c} = 0.178071$ | $(4_c)$ | |
| | | $R_{4c}' = -1.04242$ | $s_{45} = 0.077015$ | | |
| V | $L_5$ | $R_5 = +1.31310$ | $d_5 = 0.076984$ | (5) | |
| | | $R_5' = +1.40548$ | $CS = s_{56} = 0.126435$ | | |
| VI | $L_6$ | $R_6 = -0.75532$ | $d_6 = 0.041384$ | (6) N | |
| | | $R_6' = +2.18656$ | $s_{67} = 0.063707\ (\gamma)$ | | |
| VII | $L_7$ | $R_7 = -1.75314$ | $d_7 = 0.122479$ | (7) | |
| | | $R_7' = -0.65890$ | $s_{78} = 0.002217$ | | |
| VIII | $L_8$ | $R_8 = +7.04544$ | $d_8 = 0.154131$ | (8) | |

Figure 15:
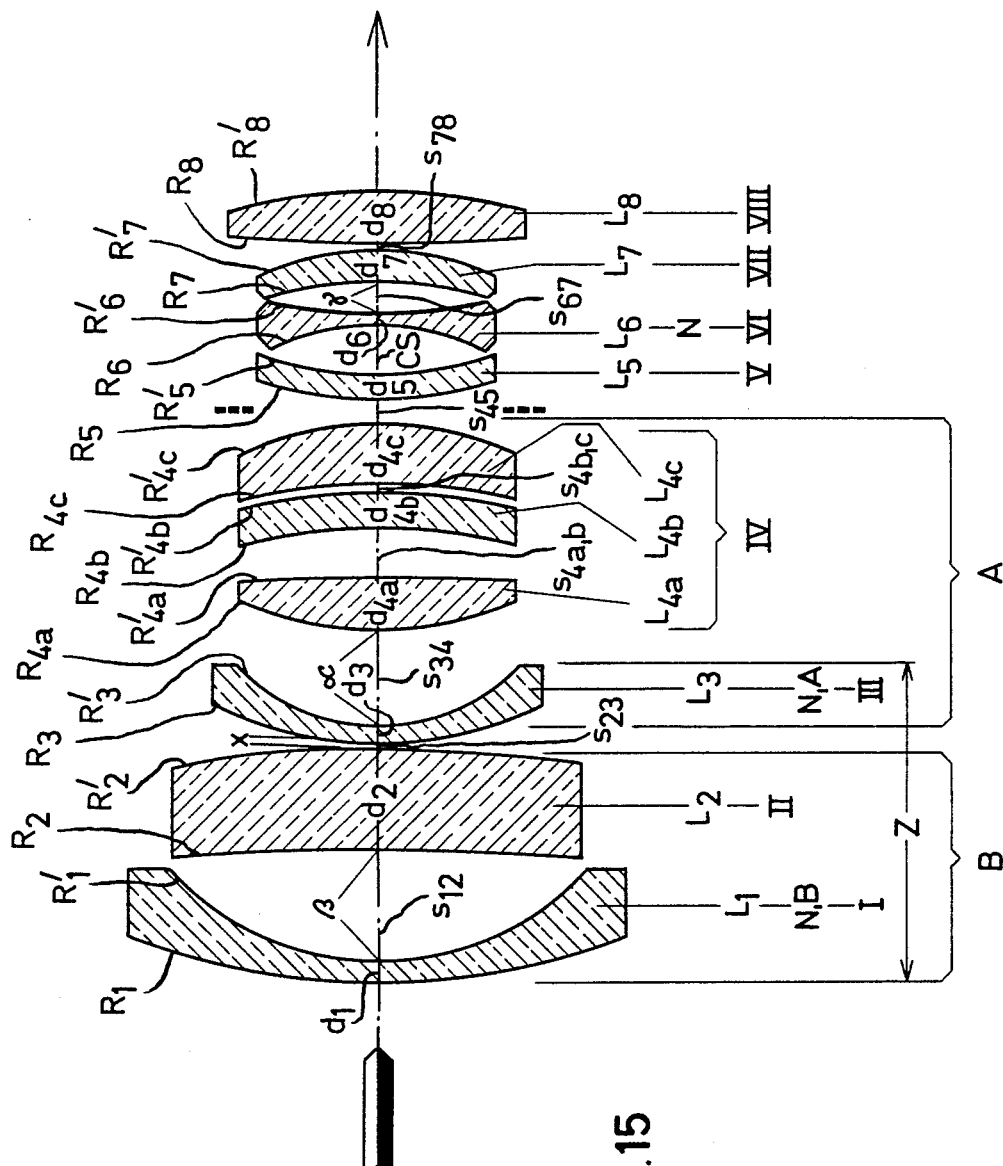

Example 27-continued
(FIG. 15)

F = 1.0000     f/2     $2\omega_u = 74.5°$     $s_\infty' = +1.2586\ F$

| Member | Lens | Radii | Thicknesses and Spacings | Glass Des. |
|---|---|---|---|---|
| | | $R_H' = -1.39672$ | | |

Table of glass values

| | Example 26 | | Example 27 |
|---|---|---|---|
| Lens | $n_d / \gamma_d$ | Lens | $n_d / \gamma_d$ |
| $L_1$ | 1.60361/53.65 | $L_1$ | 1.62299/58.06 |
| $L_2$ | 1.62004/36.37 | $L_2$ | 1.68893/31.17 |
| $L_3$ | 1.74400/44.77 | $L_3$ | 1.78443/43.90 |
| $L_{4a}$ | 1.74400/44.77 | $L_{4a}$ | 1.74400/44.77 |
| $L_{4b}$ | 1.67790/55.20 | $L_{4b}$ | 1.74400/44.77 |
| $L_5$ | 1.48749/70.45 | $L_{4c}$ | 1.64250/57.94 |
| $L_{6a}$ | 1.80518/25.43 | $L_5$ | 1.69100/54.71 |
| $L_{6b}$ | 1.51009/63.52 | $L_6$ | 1.84666/23.82 |
| $L_7$ | 1.67790/55.20 | $L_7$ | 1.71300/53.85 |
| | | $L_8$ | 1.74400/44.77 |

List of features I

| Example | $Q_a$ | $Q_b$ |
|---|---|---|
| 22 | −0.61306 | −1.27546 |
| 23 | −1.06006 | −1.90523 |
| 24 | −0.69873 | −1.55236 |
| 25 | −0.95070 | −2.08990 |
| 26 | −0.61920 | −1.51176 |
| 27 | −0.96895 | −2.11898 |

List of features II

| Example | $f_z$ | $G_{II}$ | According to claim: |
|---|---|---|---|
| 22 | −0.8911 F | −3.4078 | 24 |
| 23 | −0.9059 F | −8.2321 | 25 |
| 24 | −0.7583 F | −9.1458 | 25 |
| 25 | −1.0067 F | −3.0000 | 24 |
| 26 | −0.7272 F | −9.3009 | 25 |
| 27 | −1.0070 F | −3.0706 | 24 |

The foregoing table headed "List of features I" relates only to Examples 22–27. Similar information for Examples 1–21 is given in the following table, the values of $Q_a$ and $Q_b$ being calculated from the data originally given with respect to Examples 1–21.

List of features III

| | $Q_a$ | $Q_b$ |
|---|---|---|
| Example 1 | −1.43486 | −2.55303 |
| 2 | −0.85946 | −1.82915 |
| 3 | −1.03364 | −1.93338 |
| 4 | −1.51344 | −2.58972 |
| 5 | −1.48437 | −2.81204 |
| 6 | −1.25276 | −2.32086 |
| 7 | −1.38494 | −2.67130 |
| 8 | −1.54191 | −2.46673 |
| 9 | −1.38493 | −2.67130 |
| 10 | −1.52796 | −2.43122 |
| 11 | −1.48544 | −2.19861 |
| 12 | −1.21451 | −1.83751 |
| 13 | −1.53811 | −2.40226 |
| 14 | −0.99262 | −2.12914 |
| 15 | −1.52654 | −2.47684 |
| 16 | −1.46973 | −2.38381 |
| 17 | −1.51501 | −2.46370 |
| 18 | −1.51400 | −2.62434 |
| 19 | −1.53662 | −2.66480 |
| 20 | −1.26321 | −2.22057 |
| 21 | −0.77781 | −1.76745 |

What is claimed is:

1. A high-speed wide-angle objective comprising at least seven lens components each with air both in front and behind and arranged in three groups, including a rear group of at least three components behind a central vertex space (CS), and a forward member having a first forward group (A) in front of said central vertex space and a second forward group (B) in front of said first forward group, said rear group having a negative component (N) of dispersing action, and a first positive component of collecting action behind said negative component and separated therefrom by an air space ($\gamma$) of diverging acton, and a second positive component of collecting action behind said first positive component and separated therefrom by an air space, said first and second positive components of said rear group each having a rear surface which is concave toward the front, said first and second forward groups (A and B) of said forward member each comprising the combination of a meniscus shaped component (N, A and N, B) of diverging action which is convex toward the front, the meniscus shaped component in each of said forward groups being respectively followed by a positive component of collecting action behind its respective meniscus shaped component and separated therefrom by an air space, the axial thickness of each of these two air spaces ($\alpha$ and $\beta$) being within the limits of 0.22 times and 0.50 times the quivalent focal length (F) of the entire objective, and the sum of the axial thicknesses of both of said air spaces ($\alpha$ and $\beta$) being within the limits of 0.56 times and 0.83 times said equivalent focal length (F), there being an air lens (x) of strongly collecting power between the front surface of said first forward group (A) and the rear surface of said second forward group (B), said front surface and rear surface bounding said air lens (x) being so dimensioned that the quotient ($Q_a$) of the sum of the surface powers ($\phi_x$) of said air lens divided by the sum of the paraxial surface powers ($\phi_{N, A} + \phi_{N, B}$) of said two meniscus shaped components (N, A and N, B) of said first and second forward groups has a negative value within the limits −0.77781 and −1.54919, said front surface and rear surface bounding said air lens (x) also being so dimensioned that the quotient ($Q_b$) of said sum of the surface powers ($\phi_x$) of said air lens divided by the paraxial surface power sum ($\phi_l$) of the meniscus shaped negative component (N, B) of said second forward group (B) is within the limits of $-1.76745$ and $-2.81204$.

2. An objective as defined in claim 1, wherein at least one air-glass surface of one lens component is of the said rear group is developed as an aspherical surface.

3. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d$ | Designation |
|---|---|---|---|---|---|
| I | $L_1$ | $R_1=+2.2850$ | $d_1=0.0671$ | $n_1=1.6230$ | N,B |
|  |  | $R_1'=+0.8402$ |  |  |  |
|  |  |  | $s_{12}=0.4104$ ($\beta$) |  | B |
| II | $L_2$ | $R_2=-3.5873$ | $d_2=0.4216$ | $n_2=1.6970$ |  |
|  |  | $R_2'=-2.0361$ |  |  |  |
|  |  |  | $s_{23}=0.0825$ (x) |  |  |
| III | $L_3$ | $R_3=+0.8705$ | $d_3=0.0608$ | $n_3=1.7440$ | N,A |
|  |  | $R_3'=+0.6098$ |  |  |  |
|  |  |  | $s_{34}=0.3200$ ($\alpha$) |  |  |
| IV | $L_{4a}$ | $R_{4a}=+1.0472$ | $d_{4a}=0.4897$ | $n_{4a}=1.7440$ | A |
|  |  | $R_{4a}'=-1.7786$ |  |  |  |
|  |  |  | $s_{4a,b}=0$ |  |  |
|  | $L_{4b}$ | $R_{4b}=-1.7786$ | $d_{4b}=0.2050$ | $n_{4b}=1.6227$ |  |
|  |  | $R_{4b}'=-1.2905$ |  |  |  |
|  |  |  | CS=0.18245 |  |  |
| V | $L_5$ | $R_5=-1.0304$ | $d_5=0.0417$ | $n_5=1.8467$ | N |
|  |  | $R_5'=+1.4005$ |  |  |  |
|  |  |  | $s_{56}=0.0744$ ($\gamma$) |  |  |
| VI | $L_6$ | $R_6=-1.7081$ | $d_6=0.1713$ | $n_6=1.7308$ |  |
|  |  | $R_6'=-0.8482$ |  |  |  |
|  |  |  | $s_{67}=0.00355$ |  |  |
| VII | $L_7$ | $R_7=+4.4726$ | $d_7=0.1295$ | $n_7=1.7290$ |  |
|  |  | $R_7'=-1.384946$ |  |  |  |

4. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d$ | Des. |
|---|---|---|---|---|---|
| I | $L_1$ | $R_1=+1.800$ | $d_1=0.060$ | $n_1=1.623$ | N,B |
|  |  | $R_1'=+0.720$ |  |  |  |
|  |  |  | $s_{12}=0.380$ ($\beta$) |  | B |
| II | $L_2$ | $R_2=\pm$plan | $d_2=0.600$ | $n_2=1.638$ |  |
|  |  | $R_2'=-1.800$ |  |  |  |
|  |  |  | $s_{23}=0.010$ (x) |  |  |
| III | $L_3$ | $R_3=+1.250$ | $d_3=0.100$ | $n_3=1.744$ | N,A |
|  |  | $R_3'=+0.630$ |  |  |  |
|  |  |  | $s_{34}=0.300$ ($\alpha$) |  |  |
| IV | $L_{4a}$ | $R_{4a}=+0.910$ | $d_{4a}=0.290$ | $n_{4a}=1.744$ | A |
|  |  | $R_{4a}'=-0.910$ |  |  |  |
|  |  |  | $s_{4a,b}=0$ |  |  |
|  | $L_{4b}$ | $R_{4b}=-0.910$ | $d_{4b}=0.350$ | $n_{4b}=1.638$ |  |
|  |  | $R_{4b}'=-1.730$ |  |  |  |
|  |  |  | CS=0.135 |  |  |

-continued

| Member | Lens | Radii | Thicknesses and Spacings | $n_d$ | Des. |
|---|---|---|---|---|---|
| V | $L_5$ | $R_5=-0.910$ | $d_5=0.070$ | $n_5=1.840$ | N |
|  |  | $R_5'=+1.450$ |  |  |  |
|  |  |  | $s_{56}=0.060$ ($\gamma$) |  |  |
| VI | $L_6$ | $R_6=-3.350$ | $d_6=0.165$ | $n_6=1.710$ |  |
|  |  | $R_6'=-0.780$ |  |  |  |
|  |  |  | $s_{67}=0.002$ |  |  |
| VII | $L_7$ | $R_7=\pm$plan | $d_7=0.128$ | $n_7=1.758$ |  |
|  |  | $R_7'=-1.40126$ |  |  |  |

5. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d$ | Des. |
|---|---|---|---|---|---|
| I | $L_1$ | $R_1=+2.0864$ | $d_1=0.1022$ | $n_1=1.623$ | N,B |
|  |  | $R_1'=+0.7487$ |  |  |  |
|  |  |  | $s_{12}=0.3410$ ($\beta$) |  | B |
| II | $L_2$ | $R_2=-4.3840$ | $d_2=0.2463$ | $n_2=1.685$ |  |
|  |  | $R_2'=-2.2654$ |  |  |  |
|  |  |  | $s_{23}=0.0025$ (x) |  |  |
| III | $L_3$ | $R_3=+1.0208$ | $d_3=0.0575$ | $n_3=1.744$ | N,A |
|  |  | $R_3'=+0.6236$ |  |  |  |
|  |  |  | $s_{34}=0.2450$ ($\alpha$) |  |  |
| IV | $L_{4a}$ | $R_{4a}=+1.0135$ | $d_{4a}=0.5112$ | $n_{4a}=1.744$ | A |
|  |  | $R_{4a}'=+1.1690$ |  |  |  |
|  |  |  | $s_{4a,b}=0$ |  |  |
|  | $L_{4b}$ | $R_{4b}=-1.1690$ | $d_{4b}=0.2035$ | $n_{4b}=1.596$ |  |
|  |  | $R_{4b}'=-1.2761$ |  |  |  |
|  |  |  | CS=0.2186 |  |  |
| V | $L_5$ | $R_5=-0.8662$ | $d_5=0.0407$ | $n_5=1.847$ | N |
|  |  | $R_5'=+1.7584$ |  |  |  |
|  |  |  | $s_{56}=0.0739$ ($\gamma$) |  |  |
| VI | $L_6$ | $R_6=-1.4808$ | $d_6=0.1207$ | $n_6=1.731$ |  |
|  |  | $R_6'=-0.7486$ |  |  |  |
|  |  |  | $s_{67}=0.0028$ |  |  |
| VII | $L_7$ | $R_7=+5.1500$ | $d_7=0.1428$ | $n_7=1.729$ |  |
|  |  | $R_7'=-1.11751$ |  |  |  |

6. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d$ | Des. |
|---|---|---|---|---|---|
| I | $L_1$ | $R_1=+1.8875$ | $d_1=0.0558$ | $n_1=1.6230$ | N,B |
|  |  | $R_1'=+0.7626$ |  |  |  |
|  |  |  | $s_{12}=0.3876$ ($\beta$) |  | B |
| II | $L_2$ | $R_2=-2.4000$ | $d_2=0.4348$ | $n_2=1.6450$ |  |
|  |  | $R_2'=-1.6645$ |  |  |  |
|  |  |  | $s_{23}=0.0100$ (x) |  |  |
| III | $L_3$ | $R_3=+0.8518$ | $d_3=0.0620$ | $n_3=1.7440$ | N,A |
|  |  | $R_3'=+0.6100$ |  |  |  |
|  |  |  | $s_{34}=0.3232$ ($\alpha$) |  |  |
| IV | $L_{4a}$ | $R_{4a}=+0.8942$ | $d_{4a}=0.5194$ | $n_{4a}=1.7440$ | A |
|  |  | $R_{4a}'=-0.7070$ |  |  |  |
|  |  |  | $s_{4a,b}=0$ |  |  |
|  | $L_{4b}$ | $R_{4b}=-0.7070$ | $d_{4b}=0.1008$ | $n_{4b}=1.6690$ |  |
|  |  | $R_{4b}'=-2.3013$ |  |  |  |

-continued

| Member | Lens | Radii | Thicknesses and Spacings | $n_d$ | Des. |
|---|---|---|---|---|---|
| | | | CS=0.1462 | | |
| V | $L_5$ | $R_5=-0.9297$ | $d_5=0.0421$ | $n_5=1.8470$ | N |
| | | $R_5'=+1.3678$ | | | |
| | | | $s_{56}=0.0692$ ($\gamma$) | | |
| VI | $L_6$ | $R_6=-2.8018$ | $d_6=0.0967$ | $n_6=1.7320$ | |
| | | $R_6'=-0.8018$ | | | |
| | | | $s_{67}=0.0033$ | | |
| VII | $L_7$ | $R_7=+148.81$ | $d_7=0.1310$ | $n_7=1.7420$ | |
| | | $R_7'=-1.175333$. | | | |

7. An objective as defined in claim 1, wherein the componnents have substantially the characteristics set forth below, linear dimensions being stated with reference to the equivalent focal length of the entire objective, considered as unity;

| Member | Lens | Radii | Thicknesses and Spacings | $n_d$ | Des. |
|---|---|---|---|---|---|
| I | $L_1$ | $R_1=+1.8588$ | $d_1=0.0566$ | $n_1=1.623$ | N,B |
| | | $R_1'=+0.8055$ | | | |
| | | | $s_{12}=0.3646$ ($\beta$) | | B |
| II | $L_2$ | $R_2=-2.7587$ | $d_2=0.5530$ | $n_2=1.644$ | |
| | | $R_2'=-2.0255$ | | | |
| | | | $s_{23}=0.0034$ (x) | | |
| III | $L_3$ | $R_3=+0.8573$ | $d_3=0.0601$ | $n_3=1.784$ | N,A |
| | | $R_3'=+0.6001$ | | | |
| | | | $s_{34}=0.3053$ ($\alpha$) | | |
| IV | $L_{4a}$ | $R_{4a}=+0.9508$ | $d_{4a}=0.4842$ | $n_{4a}=1.744$ | A |
| | | $R_{4a}'=-0.7125$ | | | |
| | | | $s_{4a.b}=0$ | | |
| | $L_{4b}$ | $R_{4b}=-0.7125$ | $d_{4b}=0.0775$ | $n_{4b}=1.664$ | |
| | | $R_{4b}'=-2.5621$ | | | |
| | | | CS=0.23425 | | |
| V | $L_5$ | $R_5=-0.9797$ | $d_5=0.0434$ | $n_5=1.847$ | N |
| | | $R_5'=+1.5456$ | | | |
| | | | $s_{56}=0.0664$ ($\gamma$) | | |
| VI | $L_6$ | $R_6=-3.0370$ | $d_6=0.1024$ | $n_6=1.727$ | |
| | | $R_6'=-0.7763$ | | | |
| | | | $s_{67}=0.0057$ | | |
| VII | $L_7$ | $R_7=+63.570$ | $d_7=0.1201$ | $n_7=1.776$ | |
| | | $R_7'=-1.326092$. | | | |

8. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d/\nu_d$ | Des. |
|---|---|---|---|---|---|
| I | $L_1$ | $R_1=+2.00966$ | $d_1=0.062399$ | 1.62299/ 58.06 | N,B |
| | | $R_1'=+0.78299$ | | | |
| | | | $s_{12}=0.369912$ ($\beta$) | | B |
| II | $L_2$ | $R_2=-3.39819$ | $d_2=0.537113$ | 1.65844/ 50.88 | |
| | | $R_2'=-2.00966$ | | | |
| | | | $s_{23}=0.002413$ (x) | | |

-continued

| Member | Lens | Radii | Thicknesses and Spacings | $n_d/\nu_d$ | Des. |
|---|---|---|---|---|---|
| III | $L_3$ | $R_3=+0.93057$ | $d_3=0.101010$ | 1.74400/ 44.77 | N,A |
| | | $R_3'=+0.61306$ | | | |
| | | | $s_{34}=0.275107$ ($\alpha$) | | |
| IV | $L_{4a}$ | $R_{4a}=+0.91068$ | $d_{4a}=0.288552$ | 1.74400/ 44.77 | A |
| | | $R_{4a}'=-0.84138$ | | | |
| | | | $s_{4a.b}=0$ | | |
| | $L_{4b}$ | $R_{4b}=-0.84138$ | $d_{4b}=0.347848$ | 1.63854/ 55.38 | |
| | | $R_{4b}'=-1.80405$ | | | |
| | | | CS=0.132037 | | |
| V | $L_5$ | $R_5=-0.92388$ | $d_5=0.065846$ | 1.84666/ 23.82 | N |
| | | $R_5'=+1.44334$ | | | |
| | | | $s_{56}=0.061365$ ($\gamma$) | | |
| VI | $L_6$ | $R_6=-3.37381$ | $d_6=0.163409$ | 1.71300/ 53.85 | |
| | | $R_6'=-0.78864$ | | | |
| | | | $s_{67}=0.003103$ | | |
| VII | $L_7$ | $R_7=+153.991$ | $d_7=0.131348$ | 1.75719/ 47.83. | |
| | | $R_7'=-1.392357$ | | | |

9. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d$ | Des. |
|---|---|---|---|---|---|
| I | $L_1$ | $R_1=+1.8408$ | $d_1=0.05593$ | $n_1=1.6230$ | N,B |
| | | $R_1'=+0.8063$ | | | |
| | | | $s_{12}=0.35616$ ($\beta$) | | |
| II | $L_{2a}$ | $R_{2a}=-2.9958$ | $d_{2a}=0.12068$ | $n_{2a}=1.6441$ | |
| | | $R_{2a}'=\pm$plan | | | B |
| | | | $s_{2a.b}=0.16223$ | | |
| | $L_{2b}$ | $R_{2b}=\pm$plan | $d_{2b}=0.15518$ | $n_{2b}=1.6441$ | |
| | | $R_{2b}'=-2.1862$ | | | |
| | | | $s_{23}=0.00172$ (x) | | |
| III | $L_3$ | $R_3=+0.9065$ | $d_3=0.06166$ | $n_3=1.7845$ | N,A |
| | | $R_3'=+0.6183$ | | | |
| | | | $s_{34}=0.30560$ ($\alpha$) | | |
| IV | $L_{4a}$ | $R_{4a}=+0.9810$ | $d_{4a}=0.48840$ | $n_{4a}=1.7440$ | A |
| | | $R_{4a}'=-0.8015$ | | | |
| | | | $s_{4a.b}=0$ | | |
| | $L_{4b}$ | $R_{4b}=-0.8015$ | $d_{4b}=0.8630$ | $n_{4b}=1.6622$ | |
| | | $R_{4b}'=-2.2830$ | | | |
| | | | CS=0.26028 | | |
| V | $L_5$ | $R_5=-0.9843$ | $d_5=0.04270$ | $n_5=1.8466$ | N |
| | | $R_5'=+1.6384$ | | | |
| | | | $s_{56}=0.06852$ ($\gamma$) | | |
| VI | $L_6$ | $R_6=-2.1270$ | $d_6=0.09600$ | $n_6=1.7223$ | |
| | | $R_6'=-0.7800$ | | | |
| | | | $s_{67}=0.00355$ | | |
| VII | $L_7$ | $R_7=+9.5810$ | $d_7=0.12045$ | $n_7=1.7720$ | |
| | | $R_7'=-1.26038$. | | | |

10. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d\nu_d$ | Des. |
|---|---|---|---|---|---|
| I | $L_1$ | $R_1=+2.27339$ | $d_1=0.063321$ | 1.62299/ 58.06 | N,B |
| | | $R_1'=+0.79256$ | $s_{12}=0.401806$ | | ($\beta$) B |
| II | $L_2$ | $R_2=-2.85344$ | $d_2=0.536455$ | 1.63854/ 55.38 | |
| | | $R_2'=-1.68505$ | $s_{23}=0.003623$ | | (x) |
| III | $L_3$ | $R_3=+0.84159$ | $d_3=0.064771$ | 1.74400/ 44.77 | N,A |
| | | $R_3'=+0.62461$ | $s_{34}=0.310465$ | | ($\alpha$) |
| IV | $L_{4a}$ | $R_{4a}=+0.92793$ | $d_{4a}=0.315917$ | 1.74400/ 44.77 | |
| | | $R_{4a}'=-0.69260$ | $s_{4a,b}=0$ | | A |
| | $L_{4b}$ | $R_{4b}=-0.69260$ | $d_{4b}=0.112460$ | 1.67003/ 47.12 | |
| | | $R_{4b}'=+1.85739$ | $s_{4b,c}=0.1138\text{-}75$ | | |
| | $L_{4c}$ | $R_{4c}=+2.96048$ | $d_{4c}=0.180268$ | 1.70181/ 41.02 | |
| | | $R_{4c}'=-1.86261$ | CS=0.125539 | | |
| V | $L_5$ | $R_5=-0.83832$ | $d_5=0.067324$ | 1.84666/ 23.82 | N |
| | | $R_5'=+1.79315$ | $s_{56}=0.060112$ | | ($\gamma$) |
| VI | $L_6$ | $R_6=-3.02071$ | $d_6=0.106456$ | 1.71300/ 53.85 | |
| | | $R_6'=-0.84727$ | $s_{67}=0.026605$ | | |
| VII | $L_7$ | $R_7=-45.4622$ | $d_7=0.130335$ | 1.78831/ 47.37. | |
| | | $R_7'=-1.163478$ | | | |

11. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d$ | Des. |
|---|---|---|---|---|---|
| I | $L_1$ | $R_1=+1.8408$ | $d_1=0.05593$ | $n_1=1.6230$ | N,B |
| | | $R_1'=+0.8063$ | $s_{12}=0.35616$ | | ($\beta$) B |
| II | $L_2$ | $R_2=-2.9938$ | $d_2=0.54240$ | $n_2=1.6441$ | |
| | | $R_2'=-2.1857$ | $s_{23}=0.00185$ | | (x) |
| III | $L_3$ | $R_3=+0.9065$ | $d_3=0.06165$ | $n_3=1.7845$ | N,A |
| | | $R_3'=+0.6183$ | $s_{34}=0.30565$ | | ($\alpha$) |
| IV | $L_{4a}$ | $R_{4a}=+0.9810$ | $d_{4a}=0.15517$ | $n_{4a}=1.7440$ | |
| | | $R_{4a}'=\pm\text{plan}$ | $s_{4a,b}=0.10200$ | | A |
| | $L_{4b}$ | $R_{4b}=\pm\text{plan}$ | $d_{4b}=0.15517$ | $n_{4b}=1.7440$ | |
| | | $R_{4b}'=-0.8015$ | $s_{4b,c}=0$ | | |
| | $L_{4c}$ | $R_{4c}=-0.8015$ | $d_{4c}=0.08630$ | $n_{4c}=1.6622$ | |
| | | $R_{4c}'=-2.2834$ | CS=0.26028 | | |
| V | $L_5$ | $R_5=-0.9843$ | $d_5=0.04270$ | $n_5=1.8466$ | N |
| | | $R_5'=+1.6383$ | $s_{56}=0.06851$ | | ($\gamma$) |
| VI | $L_6$ | $R_6=-2.1270$ | $d_6=0.09600$ | $n_6=1.7223$ | |
| | | $R_6'=-0.7800$ | $s_{67}=0.00355$ | | |
| VII | $L_7$ | $R_7=+9.5810$ | $d_7=0.12044$ | $n_7=1.7720$ | |
| | | $R_7'=-1.26031$ | | | |

12. An objective as defined in claim 1, wherein the components have substantially the characteristics set forth below, linear dimensons being stated with reference to the equivalent focal length of the entire objective, considered as unity;

| Member | Lens | Radii | Thicknesses and Spacings | $n_d$ | Des. |
|---|---|---|---|---|---|
| I | $L_{1a}$ | $R_{1a}=+1.8000$ | $d_{1a}=0.06825$ | $n_{1a}=1.713$ | N,B |
| | | $R_{1a}'=+1.4700$ | $s_{1a,b}=0.05200$ | | |
| | $L_{1b}$ | $R_{1b}=+1.8000$ | $d_{1b}=0.06480$ | $n_{1b}=1.620$ | B |
| | | $R_{1b}'=+0.8000$ | $s_{12}=0.40200$ | | ($\beta$) |
| II | $L_2$ | $R_2=-2.7735$ | $d_2=0.56460$ | $n_2=1.639$ | |
| | | $R_2'=-1.6863$ | $s_{23}=0.00360$ | | (x) |
| III | $L_3$ | $R_3=+0.8416$ | $d_3=0.06477$ | $n_3=1.744$ | N,A |
| | | $R_3'=+0.6246$ | $s_{34}=0.31046$ | | ($\alpha$) |
| IV | $L_{4a}$ | $R_{4a}=+0.9279$ | $d_{4a}=0.31654$ | $n_{4a}=1.744$ | |
| | | $R_{4a}'=-0.6246$ | $s_{4a,b}=0$ | | A |
| | $L_{4b}$ | $R_{4b}=-0.6246$ | $d_{4b}=0.11200$ | $n_{4b}=1.670$ | |
| | | $R_{4b}'=+1.8000$ | $s_{4b,c}=0.10950$ | | |
| | $L_{4c}$ | $R_{4c}=+3.1404$ | $d_{4c}=0.18550$ | $n_{4c}=1.702$ | |
| | | $R_{4c}'=-1.8000$ | CS=0.12550 | | |
| V | $L_5$ | $R_5=-0.8416$ | $d_5=0.06488$ | $n_5=1.848$ | N |
| | | $R_5'=+1.8000$ | $s_{56}=0.06200$ | | ($\gamma$) |
| VI | $L_6$ | $R_6=-2.7735$ | $d_6=0.10650$ | $n_6=1.713$ | |
| | | $R_6'=-0.8473$ | $s_{67}=0.02660$ | | |
| VII | $L_7$ | $R_7=\pm\text{plan}$ | $d_7=0.16136$ | $n_7=1.788$ | |
| | | $R_7'=\pm\text{plan.}$ | | | |

13. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d/\nu_d$ | Des. |
|---|---|---|---|---|---|
| I | $L_{1a}$ | $R_{1a}=+6.06896$ | $d_{1a}=0.274276$ | 1.62299/ 58.06 | |
| | | $R_{1a}'=+26.81329$ | $s_{1a,b}=0.116872$ | | N,B |
| | $L_{1b}$ | $R_{1b}=+4.11457$ | $d_{1b}=0.103334$ | 1.62299/ 58.06 | B |
| | | $R_{1b}'=+0.75189$ | $s_{12}=0.406824$ | | ($\beta$) |
| II | $L_2$ | $R_2=-2.67095$ | $d_2=0.527744$ | 1.63854/ 55.38 | |
| | | $R_2'=-1.66321$ | $s_3=0.001945$ | | (x) |
| III | $L_3$ | $R_3=+0.79976$ | $d_3=0.109386$ | 1.74400/ 44.77 | N,A |
| | | $R_3'=+0.61121$ | $s_{34}=0.345903$ | | ($\alpha$) |
| IV | $L_{4a}$ | $R_{4a}=+0.99589$ | $d_{4a}=0.326579$ | 1.74400/ 44.77 | |
| | | $R_{4a}'=-1.35427$ | $s_{4a,b}=0$ | | A |
| | $L_{4b}$ | $R_{4b}=-1.35427$ | $d_{4b}=0.100093$ | 1.67003/ 47.12 | |
| | | $R_{4b}'=+9.44666$ | $s_{4b,c}=0.076459$ | | |
| | $L_{4c}$ | $R_{4c}=-4.68440$ | $d_{4c}=0.165648$ | 1.70181/ 41.02 | |
| | | $R_{4c}'=-1.24868$ | CS=0.134524 | | |

-continued

| Member | Lens | Radii | Thicknesses and Spacings | $n_d/\nu_d$ | Des. |
|---|---|---|---|---|---|
| V | $L_5$ | $R_5=-1.08993$ | $d_5=0.047369$ | 1.84666/ 23.82 | N ($\gamma$) |
|  |  | $R_5'=+1.41522$ | $s_{56}=0.071779$ |  |  |
| VI | $L_6$ | $R_6=-13.44784$ | $d_6=0.107141$ | 1.71300/ 53.85 |  |
|  |  | $R_6'=-0.92784$ | $s_{67}=0.006631$ |  |  |
| VII | $L_7$ | $R_7=+3.60922$ | $d_7=0.143634$ | 1.78831/ 47.37. |  |
|  |  | $R_7'=-2.87824$ |  |  |  |

14. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d/\nu_d$ | Des. |
|---|---|---|---|---|---|
| I | $L_1$ | $R_1=+2.66056$ | $d_1=0.055207$ | 1.63854/ 55.38 | N,B ($\beta$) |
|  |  | $R_1'=+0.74984$ | $s_{12}=0.383671$ |  |  |
| II | $L_2$ | $R_2=-2.25474$ | $d_2=0.412143$ | 1.66446/ 35.84 | (x) |
|  |  | $R_2'=-1.59625$ | $s_{23}=0.001736$ |  |  |
| III | $L_3$ | $R_3=+1.05161$ | $d_3=0.079859$ | 1.74400/ 44.77 | N,A ($\alpha$) |
|  |  | $R_3'=+0.72856$ | $s_{34}=0.246869$ |  |  |
| IV | $L_{4a}$ | $R_{4a}=+1.10591$ | $d_{4a}=0.312492$ | 1.74400/ 44.77 |  |
|  |  | $R_{4a}'=-0.75526$ | $s_{4a,b}=0$ |  | A |
|  | $L_{4b}$ | $R_{4b}=-0.75526$ | $d_{4b}=0.238189$ | 1.60562/ 43.92 |  |
|  |  | $R_{4b}'=+5.66375$ | $s_{4b,c}=0.173607$ |  |  |
|  | $L_{4c}$ | $R_{4c}=+4.69746$ | $d_{4c}=0.207287$ | 1.72000/ 50.42 |  |
|  |  | $R_{4c}'=;126 -1.46420$ |  |  |  |
|  |  |  | CS=0.061110 |  |  |
| V | $L_5$ | $R_5=-0.89762$ | $d_5=0.269785$ | 1.80518/ 25.43 | N ($\gamma$) |
|  |  | $R_5'=+1.67871$ | $s_{56}=0.071526$ |  |  |
| VI | $L_6$ | $R_6=-4.37108$ | $d_6=0.099998$ | 1.71300/ 55.85 |  |
|  |  | $R_6'=-1.08230$ | $s_{67}=0.003472$ |  |  |
| VII | $L_7$ | $R_7=-25.29870$ | $d_7=0.105206$ | 1.78831 47.37. |  |
|  |  | $R_7'=-1.25886$ |  |  |  |

15. An objective as defined in claim 1, wherein the components have substantially the characteristics set forth below, linear dimensions being stated with reference to the equivalent focal length of the entire objective, considered as unity;

| Member | Lens | Radii | Thicknesses and Spacings | $n_d/\nu_d$ | Des. |
|---|---|---|---|---|---|
| I | $L_1$ | $R_1=+2.26535$ | $d_1=0.055520$ | 1.61765/ 15.15 | N,B ($\beta$) |
|  |  | $R_1'=+0.76789$ | $s_{12}=0.379649$ |  |  |
| II | $L_2$ | $R_2=-2.33423$ | $d_2=0.408954$ | 1.66446/ 35.84 | (x) |
|  |  | $R_2'=-1.59449$ | $s_{23}=0.011632$ |  |  |

-continued

| Member | Lens | Radii | Thicknesses and Spacings | $n_d/\nu_d$ | Des. |
|---|---|---|---|---|---|
| III | $L_3$ | $R_3=+0.86457$ | $d_3=0.074340$ | 1.74400/ 44.77 | N,A ($\alpha$) |
|  |  | $R_3'=+0.64179$ | $s_{34}=0.310552$ |  |  |
| IV | $L_{4a}$ | $R_{4a}=+1.06323$ | $d_{4a}=0.312497$ | 1.74400/ 44.77 |  |
|  |  | $R_{4a}'=-0.696212$ | $s_{4a,b}=0$ |  | A |
|  | $L_{4b}$ | $R_{4b}=-0.69612$ | $d_{4b}=0.178818$ | 1.63930/ 45.18 |  |
|  |  | $R_{4b}'=+1.00083$ | $s_{4b,c}=0.170137$ |  |  |
|  | $L_{4c}$ | $R_{4c}=+6.25996$ | $d_{4c}=0.150346$ | 1.72000/ 50.42 |  |
|  |  | $R_{4c}'=-1.33957$ | CS=0.086596 |  |  |
| V | $L_5$ | $R_5=-0.84073$ | $d_5=0.193366$ | 1.80518/ 25.43 | N ($\gamma$) |
|  |  | $R_5'=+1.86314$ | $s_{56}=0.073888$ |  |  |
| VI | $L_6$ | $R_6=-4.21844$ | $d_6=0.107048$ | 1.71300/ 53.85 |  |
|  |  | $R_6'=-1.01593$ | $s_{67}=0.001840$ |  |  |
| VII | $L_7$ | $R_7=+44.35558$ | $d_7=0.128783$ | 1.78831/ 47.37. |  |
|  |  | $R_7'=-1.30095$ |  |  |  |

16. An objective as defined in claim 1, wherein the component have substantially the characteristics set forth below, linear dimensions being stated with reference to the equivalent focal length of the entire objective, considered as unity;

| Member | Lens | Radii | Thicknesses and Spacings | $n_d$ | Des. |
|---|---|---|---|---|---|
| I | $L_1$ | $R_1=+1.9880$ | $d_1=0.05362$ | $n_1=1.6230$ | N,B ($\beta$) |
|  |  | $R_1'=+0.7849$ | $s_{12}=0.30053$ |  |  |
| II | $L_2$ | $R_2=-10.757$ | $d_2=0.27752$ | $n_2=1.7031$ | (x) |
|  |  | $R_2'=-3.0655$ | $s_{23}=0.00262$ |  |  |
| III | $L_3$ | $R_3=+0.9888$ | $d_3=0.05680$ | $n_3=1.7844$ | N,A ($\alpha$) |
|  |  | $R_3'=+0.5840$ | $s_{34}=0.26857$ |  |  |
| IV | $L_{4a}$ | $R_{4a}=+1.0145$ | $d_{4a}=0.49112$ | $n_{4a}=1.7440$ |  |
|  |  | $R_{4a}'=-1.6585$ | $s_{4a,b}=0$ |  | A |
|  | $L_{4b}$ | $R_{4b}=-1.6585$ | $d_{4b}=0.17648$ | $n_{4b}=1.6401$ |  |
|  |  | $R_{4b}'=-1.1749$ | CS=0.07075 |  |  |
| V | $L_5$ | $R_5=+1.5440$ | $d_5=0.07290$ | $n_5=1.7013$ |  |
|  |  | $R_5'=+1.2392$ | $s_{56}=0.11513$ |  |  |
| VI | $L_6$ | $R_6=-0.7751$ | $d_6=0.04137$ | $n_6=1.8466$ | N ($\gamma$) |
|  |  | $R_6'=+2.2732$ | $s_{67}=0.063983$ |  |  |
| VII | $L_7$ | $R_7=-1.8810$ | $d_7=0.12565$ | $n_7=1.7290$ |  |
|  |  | $R_7'=-0.6893$ | $s_{78}=0.00218$ |  |  |
| VIII | $L_8$ | $R_8=+4.9915$ | $d_8=0.15193$ | $n_8=1.7347$ |  |
|  |  | $R_8'=-1.317666.$ |  |  |  |

17. An objective as defined in claim 2, wherein the components have substantially the characteristics set forth below, linear dimensions being stated with reference to the equivalent focal length of the entire objective, considered as unity wherein the radius of curvature $R_6$ is the zenith radius of an aspheric lens surface at the point of intersection with the optical axis;

| Member | Lens | Radii | Thicknesses and Spacings | $n_d$ | Des. |
|---|---|---|---|---|---|
| I | $L_1$ | $R_1=+2.5000$ | $d_1=0.0850$ | $n_1=1.7170$ | N,B |
|  |  | $R_1'=+0.9100$ | $s_{12}=0.4750$ |  | ($\beta$) B |
| II | $L_{2a}$ | $R_{2a}=-3.2000$ | $d_{2a}=0.1713$ | $n_{2a}=1.7130$ |  |
|  |  | $R_{2a}'=-2.5000$ | $s_{2a,b}=0.2000$ |  |  |
|  | $L_{2b}$ | $R_{2b}=-2.5000$ | $d_{2b}=0.1409$ | $n_{2b}=1.7880$ |  |
|  |  | $R_{2b}'=-2.1000$ | $s_{23}=0.1890$ |  | (x) |
| III | $L_3$ | $R_3=+0.9100$ | $d_3=0.0708$ | $n_3=1.7880$ | N,A |
|  |  | $R_3'=+0.6690$ | $s_{34}=0.3255$ |  | ($\alpha$) |
| IV | $L_{4a}$ | $R_{4a}=+1.0670$ | $d_{4a}=0.3050$ | $n_{4a}=1.7440$ |  |
|  |  | $R_{4a}'=-0.9100$ | $s_{4a,b}=0$ |  | A |
|  | $L_{4b}$ | $R_{4b}=-0.9100$ | $d_{4b}=0.0790$ | $n_{4b}=1.5800$ |  |
|  |  | $R_{4b}'=+15.000$ | $s_{4b,c}=0.0754$ |  |  |
|  | $L_{4c}$ | $R_{4c}=-6.8850$ | $d_{4c}=0.1080$ | $n_{4c}=1.5700$ |  |
|  |  | $R_{4c}'=-1.9550$ | CS=0.1706 |  |  |
| V | $L_{5a}$ | $R_{5a}=-0.9920$ | $d_{5a}=0.2230$ | $n_{5a}=1.7330$ |  |
|  |  | $R_{5a}'=-1.0670$ | $s_{5a,b}=0$ |  | N |
|  | $L_{5b}$ | $R_{5b}=-1.0670$ | $d_{5b}=0.0600$ | $n_{5b}=1.8230$ |  |
|  |  | $R_{5b}'=+2.0880$ | $s_{56}=0.0500$ |  | ($\gamma$) |
| VI | $L_6$ | $R_6=+26.909$ | $d_6=0.1100$ | $n_6=1.7880$ |  |
|  |  | $R_6'=-1.2070$ | $s_{67}=0.0015$ |  |  |
| VII | $L_7$ | $R_7=-3.0040$ | $d_7=0.1010$ | $n_7=1.7880$ |  |
|  |  | $R_7'=-1.06197$ |  |  |  |

18. An objective as defined in claim 1, wherein the components have substantially the characteristics set forth below, linear dimonsions being stated with reference to the equivalent focal length of the entire objective, considered as unity wherein the radius of curvature $R_6$ is the zenith radius of an aspheric lens surface at the point of intersection with the optical axis;

| Member | Lens | Radii | Thicknesses and Spacings | $n_d$ | Des. |
|---|---|---|---|---|---|
| I | $L_1$ | $R_1=+2.5000$ | $d_1=0.0850$ | $n_1=1.7170$ | N,B |
|  |  | $R_1'=+0.9100$ | $s_{12}=0.4750$ |  | ($\beta$) |
| II | $L_{2a}$ | $R_{2a}=-3.5000$ | $d_{2a}=0.0600$ | $n_{2a}=1.6210$ | B |
|  |  | $R_{2a}'=+159.00$ | $s_{2a,b}=0.2100$ |  |  |
|  | $L_{2b}$ | $R_{2b}=-26.909$ | $d_{2b}=0.1200$ | $n_{2b}=1.7880$ |  |
|  |  | $R_{2b}'=-2.4000$ | $s_{23}=0.1636$ |  | (x) |
| III | $L_3$ | $R_3=+0.9097$ | $d_3=0.0708$ | $n_3=1.7880$ | N,A |
|  |  | $R_3'=+0.6690$ | $s_{34}=0.32548$ |  | ($\alpha$) |
| IV | $L_{4a}$ | $R_{4a}=+1.0670$ | $d_{4a}=0.3050$ | $n_{4a}=1.7440$ |  |
|  |  | $R_{4a}'=-0.9097$ | $s_{4a,b}=0$ |  | A |
|  | $L_{4b}$ | $R_{4b}=-0.9097$ | $d_{4b}=0.0790$ | $n_{4b}=1.5800$ |  |
|  |  | $R_{4b}'=+15.900$ | $s_{4b,c}=0.0754$ |  |  |
|  | $L_{4c}$ | $R_{4c}=-6.8850$ | $d_{4c}=0.1080$ | $n_{4c}=1.5700$ |  |
|  |  | $R_{4c}'=-1.9550$ | CS=0.1706 |  |  |
| V | $L_{5a}$ | $R_{5a}=-0.9920$ | $d_{5a}=0.2230$ | $n_{5a}=1.7330$ |  |
|  |  | $R_{5a}'=-1.0670$ | $s_{5a,b}=0$ |  | N |
|  | $L_{5b}$ | $R_{5b}=-1.0670$ | $d_{5b}=0.0600$ | $n_{5b}=1.8230$ |  |
|  |  | $R_{5b}'=+2.0880$ | $s_{56}=0.0500$ |  | ($\gamma$) |
| VI | $L_6$ | $R_6=+26.909$ | $d_6=0.1100$ | $n_6=1.7880$ |  |
|  |  | $R_6'=-1.2070$ | $s_{67}=0.0010$ |  |  |
| VII | $L_7$ | $R_7=-3.0040$ | $d_7=0.09591$ | $n_7=1.7880$ |  |
|  |  | $R_7'=-1.06212$ |  |  |  |

19. An objective as defined in claim 2, wherein the components have substantially the characteristics set forth below, linear dimonsions being stated with reference to the equivalent focal length of the entire objective, considered as unity wherein the radius of curvature $R_6$ is the zenith radius of an aspheric lens surface at the point of intersection with the optical axis;

| Member | Lens | Radii | Thicknesses and Spacings | $n_d$ | Des. |
|---|---|---|---|---|---|
| I | $L_1$ | $R_1=+2.5188$ | $d_1=0.08471$ | $n_1=1.713$ | N,B |
|  |  | $R_1'=+0.9116$ | $s_{12}=0.47714$ |  | ($\beta$) B |
| II | $L_2$ | $R_2=-3.1396$ | $d_2=0.49928$ | $n_2=1.717$ |  |
|  |  | $R_2'=-2.1185$ | $s_{23}=0.17260$ |  | (x) |
| III | $L_3$ | $R_3=+0.8843$ | $d_3=0.07010$ | $n_3=1.788$ | N,A |
|  |  | $R_3'=+0.6547$ | $s_{34}=0.32675$ |  | ($\alpha$) |
| IV | $L_{4a}$ | $R_{4a}=+1.0664$ | $d_{4a}=0.31445$ | $n_{4a}=1.744$ |  |
|  |  | $R_{4a}'=-0.8614$ | $s_{4a,b}=0$ |  | A |
|  | $L_{4b}$ | $R_{4b}=-0.8614$ | $d_{4b}=0.06994$ | $n_{4b}=1.580$ |  |
|  |  | $R_{4b}'=+12.362$ | $s_{4b,c}=0.07663$ |  | ($\alpha'$) |
|  | $L_{4c}$ | $R_{4c}=-6.8940$ | $d_{4c}=0.10818$ | $n_{4c}=1.570$ |  |
|  |  | $R_{4c}'=-1.9554$ | CS=0.17054 |  |  |
| V | $L_{5a}$ | $R_{5a}=-0.9923$ | $d_{5a}=0.22051$ | $n_{5a}=1.733$ |  |
|  |  | $R_{5a}'=-1.0094$ | $s_{5a,b}=0$ |  | N |
|  | $L_{5b}$ | $R_{5b}=-1.0094$ | $d_{5b}=0.05405$ | $n_{5b}=1.823$ |  |
|  |  | $R_{5b}'=+2.1121$ | $s_{56}=0.05038$ |  | ($\gamma$) |
| VI | $L_6$ | $R_6=+26.881$ | $d_6=0.10941$ | $n_6=1.788$ |  |
|  |  | $R_6'=-1.2075$ | $s_{67}=0.00191$ |  |  |
| VII | $L_7$ | $R_7=-3.0060$ | $d_7=0.10319$ | $n_7=1.788$ |  |
|  |  | $R_7'=-1.061803$ |  |  |  |

20. An objective as defined in claim 2, wherein the components have substantially the characteristics set forth below, linear dimonsions being stated with reference to the equivalent focal length of the entire objective, considered as unity wherein the radius of curvature $R_6$ is the zenith radius of an aspheric lens surface at the point of intersection with the optical axis;

| Member | Lens | Radii | Thicknesses and Spacings | $n_d$ | Des. |
|---|---|---|---|---|---|
| I | $L_1$ | $R_1=+2.3064$ | $d_1=0.07701$ | $n_1=1.713$ | N,B |
|  |  | $R_1'=+0.9426$ | $s_{12}=0.49715$ | ($\beta$) | B |
| II | $L_2$ | $R_2=-3.4587$ | $d_2=0.78358$ | $n_2=1.713$ |  |
|  |  | $R_2'=-2.2496$ | $s_{23}=0.21166$ | ($x$) |  |
| III | $L_3$ | $R_3=+0.9193$ | $d_3=0.08810$ | $n_3=1.788$ | N,A |
|  |  | $R_3'=+0.6650$ | $s_{34}=0.32940$ | ($\alpha$) |  |
| IV | $L_{4a}$ | $R_{4a}=+1.2190$ | $d_{4a}=0.31840$ | $n_{4a}=1.744$ | A |
|  |  | $R_{4a}'=-0.8460$ | $s_{4a,b}=0$ |  |  |
|  | $L_{4b}$ | $R_{4b}=-0.8460$ | $d_{4b}=0.48710$ | $n_{4b}=1.534$ |  |
|  |  | $R_{4b}'=+7.7566$ | $CS=0.18320$ |  |  |
| V | $L_{5a}$ | $R_{5a}=-1.2750$ | $d_{5a}=0.10800$ | $n_{5a}=1.945$ |  |
|  |  | $R_{5a}'=+3.2550$ | $s_{5a,b}=0$ |  | N |
|  | $L_{5b}$ | $R_{5b}=+3.2550$ | $d_{5b}=0.16275$ | $n_{5b}=1.714$ |  |
|  |  | $R_{5b}'=+2.8504$ | $s_{56}=-0.03215$ | ($\gamma$) |  |
| VI | $L_6$ | $R_6=+9.5750$ | $d_6=0.12210$ | $d_6=1.788$ |  |
|  |  | $R_6'=-1.3950$ | $s_{67}=0.00215$ | ($\delta$) |  |
| VII | $L_7$ | $R_7=-11.579$ | $d_7=0.13515$ | $d_7=1.788$ |  |
|  |  | $R_7'=-1.241121$ |  |  |  |

21. An objective as defined in claim 2, wherein the components have substantially the characteristics set forth below, linear dimensions being stated with reference to the equivalent focal length of the entire objective, considered as unity wherein the radius of curvature $R_6$ is the zenith radius of an aspheric lens surface at the point of intersection with the optical axis;

| Member | Lens | Radii | Thicknesses and Shapings | $n_d$ | Des. |
|---|---|---|---|---|---|
| I | $L_1$ | $R_1=+2.0000$ | $d_1=0.07105$ | $n_1=1.7130$ | N,B |
|  |  | $R_1'=+0.8710$ | $s_{12}=0.46680$ | ($\beta$) | B |
| II | $L_2$ | $R_2=-3.4960$ | $d_2=0.56105$ | $n_2=1.7360$ |  |
|  |  | $R_2'=+2.2585$ | $s_{23}=0.10480$ | ($x$) |  |
| III | $L_3$ | $R_3=+0.8707$ | $d_3=0.06380$ | $n_3=1.7883$ | N,A |
|  |  | $R_3'=+0.6334$ | $s_{34}=0.32350$ | ($\alpha$) |  |
| IV | $L_{4a}$ | $R_{4a}=+1.1119$ | $d_{4a}=0.29585$ | $n_{4a}=1.7440$ | A |
|  |  | $R_{4a}'=-0.8265$ | $s_{4a,b}=0$ |  |  |
|  | $L_{4b}$ | $R_{4b}=-0.8265$ | $d_{4b}=0.39045$ | $n_{4b}=1.5403$ |  |
|  |  | $R_{4b}'=+16.158$ | $CS=0.14620$ |  |  |
| V | $L_5$ | $R_5=-1.1119$ | $d_5=0.24130$ | $n_5=1.9050$ | N |
|  |  | $R_5'=+2.4908$ | $s_{56}=0.03400$ | ($\gamma$) |  |
| VI | $L_6$ | $R_6=+25.097$ | $d_6=0.10320$ | $n_6=1.7883$ |  |
|  |  | $R_6'=-1.1825$ | $s_{67}=0.00200$ |  |  |
| VII | $L_7$ | $R_7=-7.0710$ | $d_7=0.11455$ | $n_7=1.7883$ |  |
|  |  | $R_7'=-1.1209$ |  |  |  |

22. An objective as defined in claim 2, wherein the components have substantially the characteristics set forth below, linear dimensions being stated with reference to the equivalent focal length of the entire objective, considered as unity wherein the radius of curvature $R_6$ is the zenith radius of an aspheric lens surface at the point of intersection with the optical axis;

| Member | Lens | Radii | Thicknesses and Spacings | $n_d/\nu_d$ | Des. |
|---|---|---|---|---|---|
| I | $L_1$ | $R_1=+3.69309$ | $d_1=0.085974$ | 1.71300/ 53.85 | N,B |
|  |  | $R_1'=+0.99881$ | $s_{12}=0.450561$ | ($\beta$) | B |
| II | $L_2$ | $R_2=-5.49747$ | $d_2=0.396119$ | 1.69895/ 30.06 |  |
|  |  | $R_2'=-2.24026$ | $s_{23}=0.141720$ | ($x$) |  |
| III | $L_3$ | $R_3=+0.93354$ | $d_3=0.067124$ | 1.78831/ 47.37 | N,A |
|  |  | $R_4'=+0.63618$ | $s_{34}=0.320987$ | ($\alpha$) |  |
| IV | $L_{4a}$ | $R_{4a}=+1.06005$ | $d_{4a}=0.318496$ | 1.74400/ 44.77 | A |
|  |  | $R_{4a}'=-0.79246$ | $s_{4a,b}=0$ |  |  |
|  | $L_{4b}$ | $R_{4b}=-0.79246$ | $d_{4b}=0.245433$ | 1.60342/ 38.02 |  |
|  |  | $R_{4b}'=+1.77603$ | $s_{4b,c}=0.070917$ |  |  |
|  | $L_{4c}$ | $R_{4c}=-6.91419$ | $d_{4c}=0.137889$ | 1.71700/ 47.99 |  |
|  |  | $R_{4c}'=-1.53242$ | $CS=0.310259$ |  |  |
| V | $L_5$ | $R_5=-0.65771$ | $d_5=0.049539$ | 1.80518/ 25.43 | N |
|  |  | $R_5'=+97.41345$ | $s_{56}=0.034750$ | ($\gamma$) |  |
| VI | $L_6$ | $R_6=-3.57110$ | $d_6=0.116893$ | 1.63854/ 55.38 |  |
|  |  | $R_6'=-0.78609$ | $s_{67}=0.008084$ |  |  |
| VII | $L_7$ | $R_7=-4.64307$ | $d_7=0.153137$ | 1.78831/ 47.37 |  |
|  |  | $R_7'=-0.90940$ |  |  |  |

23. An objective as defined in claim 2, wherein the components have substantially the characteristics set forth below, linear dimensions being stated with reference to the equivalent focal length of the entire objective, considered as unity wherein the radius of curvature $R_6$ is the zenith radius of an aspheric lens surface at the point of intersection with the optical axis;

| Member | Lens | Radii | Thicknesses and Spacings | $n_d/\nu_d$ | Des. |
|---|---|---|---|---|---|
| I | $L_1$ | $R_1=+4.89012$ | $d_1=0.085099$ | 1.71300/ 53.85 | N,B |
|  |  | $R_1'=+1.09793$ | $s_{12}=0.354786$ | ($\beta$) | B |
| II | $L_2$ | $R_2=+15.69091$ | $d_2=0.425843$ | 1.69895/ 30.06 |  |
|  |  | $R_2'=-3.02092$ | $s_{23}=0.002124$ | ($x$) |  |
| III | $L_3$ | $R_3=+1.19673$ | $d_3=0.160708$ | 1.78831/ 47.37 | N,A |
|  |  | $R_3'=+0.60664$ | $s_{34}=0.299594$ | ($\alpha$) |  |
| IV | $L_{4a}$ | $R_{4a}=+1.07641$ | $d_{4a}=0.324029$ | 1.74400/ 44.77 | A |
|  |  | $R_{4a}'=-0.74046$ | $s_{4a,b}=0$ |  |  |
|  | $L_{4b}$ | $R_{4b}=-0.74046$ | $d_{4b}=0.346817$ | 1.60342/ 38.02 |  |
|  |  | $R_{4b}'=+2.68377$ | $s_{4b,c}=0.068552$ |  |  |
|  | $L_{4c}$ | $R_{4c}=-2.23088$ | $d_{4c}=0.094884$ | 1.71700/ 47.99 |  |
|  |  | $R_{4c}'=-1.03112$ | $CS=0.251910$ |  |  |

-continued

| Member | Lens | Radii | Thicknesses and Spacings | $n_d/\nu_d$ | Des. |
|---|---|---|---|---|---|
| V | $L_5$ | $R_5=-0.59687$ | $d_5=0.036333$ | 1.80518/ 25.43 | N (γ) |
| | | $R_5'=-12.68244$ | $s_{56}=0.032165$ | | |
| VI | $L_6$ | $R_6=-2.68675$ | $d_6=0.119173$ | 1.63854/ 55.38 | |
| | | $R_6'=-0.73659$ | $s_{67}=0.002336$ | | |
| VII | $L_7$ | $R_7=-4.98373$ | $d_7=0.165864$ | 1.78831/ 47.37. | |
| | | $R_7'=-0.85877$ | | | |

24. A high speed wide angle objective comprising at least seven lens components each with air both in front and behind and arranged in three groups, including a rear group of at least three components behind a central vertex space (CS), and a forward member having a first forward group (A) in front of said central vertex space and a second forward group (B) in front of said first forward group,
  said rear group having a negative component (N) of dispersing action, and a first positive component behind said negative component and separated therefrom by an air space of diverging action, and a second positive component behind said first positive component and separated therefrom by an air space, said first and second positive components both having unequal sides and said first positive component being a meniscus having both surfaces convex toward the rear,
  said first and second forward groups (A and B) of said forward member each enclosing at least one air space and each comprising a negative meniscus component (N, A and N, B) convex toward the front, followed by a positive component behind the respective meniscus component,
  there being an air lens (x) between the front surface of said first forward group (A) and the rear surface of said second forward group (B), the bounding surfaces of said air lens being specifically shaped so that the quotient ($Q_a$) of the sum of the surface powers ($\phi_x$) of said air lens divided by the sum of the paraxoial surface powers ($\phi_{N,A} + \phi_{N,B}$) of said two meniscus components of said first and second forward groups has a negative value within the limits $-0.61306$ and $-1.06006$, said bounding surfaces also being so shaped that the quotient ($Q_b$) of said surface powers ($\phi_x$) of the air lens divided by the paraxial surface power sum ($\phi_I$) of the negative meniscus component (N, B = I) of said second forward group (B) is within the limits of 1.27546 and $-2.11898$,
  the positive component (II) behind the negative meniscus component (I) of said second forward group B being a meniscus component concave toward the front to provide between said negative component (I) and said positive component (II) an air lens (β) which is biconvex and which has unequal sides,
  the first three, counting from the front, components (I and II and III) of the objective being so formed that is combination they together (Z) have an equivalent focal length ($f_Z$) of negative sign and having a negative value within the limits of 0.69084 times and 1.5735 times the equivalent focal length (F) of the entire objective.

25. An objective as defined in claim 24, wherein said second component (II) of said three component combination (Z) is developed as a strongly incurvated meniscus having a Gardner incurvation number ($\sigma_{II}$) within the limits of $-3.0000$ and $-9.3009$, the negative sign thereof indicating that the rear outer surface thereof is provided with a stronger curvature than the front outer surface.

26. An objective as defined in claim 24, wherein the components have substantially the characteristics set forth below, linear dimensions being stated with reference to the equivalent focal length of the entire objective, considered as unity;

| Member | Lens | Radii | Thicknesses and Spacings | Glass $n_d$ | Des. |
|---|---|---|---|---|---|
| I | $L_1$ | $R_1=+1.65457$ | $d_1=0.062195$ | 1.63408 | N,B |
| | | $R_1'=+0.67164$ | $s_{12}=0.403965$ | (β) | B |
| II | $L_2$ | $R_2=-3.40474$ | $d_2=0.303440$ | 1.66735 | Z |
| | | $R_2'=-1.85987$ | $s_{23}=0.055437$ | (x) | |
| III | $L_3$ | $R_3=+1.33577$ | $d_3=0.039787$ | 1.47624 | N,A |
| | | $R_3'=+0.49478$ | $s_{34}=0.227711$ | (α) | |
| IV | $L_{4a}$ | $R_{4a}=+0.85798$ | $d_{4a}=0.079477$ | 1.74265 | A |
| | | $R_{4a}'=+3.44524$ | $s_{4a,b}=0.147730$ | | |
| | $L_{4b}$ | $R_{4b}=+1.65951$ | $d_{4b}=0.240255$ | 1.67291 | |
| | | $R_{4b}'=-1.00365$ | $CS=s_{45}=0.106584$ | | |
| V | $L_5$ | $R_5=-0.81464$ | $d_5=0.087768$ | 1.46415 | N |
| | | $R_5'=+1.17984$ | $s_{56}=0.53185$ | (γ) | |
| VI | $L_{6a}$ | $R_{6a}=-1.89577$ | $d_{6a}=0.036428$ | 1.80292 | |
| | | $R_{6a}'=+0.81520$ | $s_{6a,b}=0$ | | |
| | $L_{6b}$ | $R_{6b}=+0.81520$ | $d_{6b}=0.130001$ | 1.47489 | |
| | | $R_{6b}'=-0.67026$ | $s_{67}=0.002175$ | | |
| VII | $L_7$ | $R_7=-16.32765$ | $d_7=0.074370$ | 1.74334 | |
| | | $R_7'=-1.19479.$ | | | |

27. An objective as defined in claim 25, wherein the components have substantially the characteristics set forth below, linear dimensions being stated with reference to the equivalent focal length of the entire objective, considered as unity;

| Member | Lens | Radii | Thicknesses and Spacings | Glass $n_d$ | Des. |
|---|---|---|---|---|---|
| I | $L_1$ | $R_1=+1.91258$ | $d_1=0.061001$ | 1.66787 | N,B |
| | | $R_1'=+0.67632$ | $s_{12}=0.325923$ | (β) | B |
| II | $L_2$ | $R_2=-1.72515$ | $d_2=0.354358$ | 1.57810 | Z |
| | | $R_2'=-1.35142$ | $s_{23}=0.176911$ | (x) | |
| III | $L_3$ | $R_3=+0.96714$ | $d_3=0.088581$ | 1.74400 | N,A |
| | | $R_3'=+0.59037$ | $s_{34}=0.237079$ | (α) | |
| IV | $L_{4a}$ | $R_{4a}=+0.87800$ | $d_{4a}=0.109338$ | 1.74367 | A |
| | | $R_{4a}'=+3.11418$ | $s_{4a,b}=0.131277$ | | |
| | $L_{4b}$ | $R_{4b}=+1.09391$ | $d_{4b}=0.126153$ | 1.68135 | |
| | | $R_{4b}'=-1.36081$ | $CS=s_{45}=0.093002$ | | |

-continued

| Member | Lens | Radii | Thicknesses and Spacings | Glass $n_d$ | Des. |
|---|---|---|---|---|---|
| V | $L_5$ | $R_5=-0.93251$ | $d_5=0.157181$ | 1.48842 | N |
|  |  | $R_5'=+0.86196$ | $s_{56}=0.055386$ | ($\gamma$) |  |
| VI | $L_{6a}$ | $R_{6a}=-5.54140$ | $d_{6a}=0.036662$ | 1.80031 |  |
|  |  | $R_{6a}'=+0.66140$ | $s_{6a,b}=0$ |  |  |
|  | $L_{6b}$ | $R_{6b}=+0.66140$ | $d_{6b}=0.133165$ | 1.51009 |  |
|  |  | $R_{6b}'=-0.73466$ | $s_{67}=0.002002$ |  |  |
| VII | $L_7$ | $R_7=-11.12371$ | $d_7=0.066729$ | 1.71470 |  |
|  |  | $R_7'=-1.57510.$ |  |  |  |

28. An objective aas defined in claim 25, wherein the components have substantially the characteristics set forth below, linear dimensions being stated with reference to the equivalent focal length of the entire objective, considered as unity;

| Member | Lens | Radii | Thicknesses and Spacings | Glass $n_d$ | Des. |
|---|---|---|---|---|---|
| I | $L_1$ | $R_1=+1.62159$ | $d_1=0.063046$ | 1.60680 | N,B |
|  |  | $R_1'=+0.64757$ | $s_{12}=0.362879$ | ($\beta$) |  |
| II | $L_2$ | $R_2=-1.64088$ | $d_2=0.236511$ | 1.58011 |  |
|  |  | $R_2'=-1.31742$ | $s_{23}=0.118200$ | (x) |  |
| III | $L_3$ | $R_3=+1.71672$ | $d_3=0.065687$ | 1.74400 | N,A |
|  |  | $R_3'=+0.66370$ | $s_{34}=0.252496$ | ($\alpha$) |  |
| IV | $L_{4a}$ | $R_{4a}=-1.02061$ | $d_{4a}=0.114153$ | 1.74065 | A |
|  |  | $R_{4a}'=+7.24185$ | $s_{4a,b}=0.086283$ |  |  |
|  | $L_{4b}$ | $R_{4b}=+1.01327$ | $d_{4b}=0.323684$ | 1.67899 |  |
|  |  | $R_{4b}'=-1.31283$ | $CS=s_{45}=0.095864$ |  |  |
| V | $L_5$ | $R_5=-0.82499$ | $d_5=0.099192$ | 1.49124 | N |
|  |  | $R_5'=+0.92996$ | $s_{56}=0.050803$ | ($\gamma$) |  |
| VI | $L_{6a}$ | $R_{6a}=-7.45722$ | $d_{6a}=0.037581$ | 1.80512 |  |
|  |  | $R_{6a}'=+0.67390$ | $s_{6a,b}=0$ |  |  |
|  | $L_{6b}$ | $R_{6b}=+0.67390$ | $d_{6b}=0.134041$ | 1.51009 |  |
|  |  | $R_{6b}'=-0.72708$ | $s_{67}=0.002135$ |  |  |
| VII | $L_7$ | $R_7=+240.7509$ | $d_7=0.068098$ | 1.70138 |  |
|  |  | $R_7'=-1.62238.$ |  |  |  |

29. An objective as defined in claim 24, wherein the components have substantially the characteristics set forth below, linear dimensions being stated with reference to the equivalent focal length of the entire objective, considered as unity;

| Member | Lens | Radii | Thicknesses and Spacings | Glass $n_d$ | Des. |
|---|---|---|---|---|---|
| I | $L_1$ | $R_1=+1.9800$ | $d_1=0.0650$ | 1.621 | N,B |
|  |  | $R_1'=+0.7900$ | $s_{12}=0.3100$ | ($\beta$) |  |
| II | $L_2$ | $R_2=-6.8000$ | $d_2=0.2850$ | 1.688 |  |
|  |  | $R_2'=-3.4000$ | $s_{23}=-0.0050$ | (x) |  |
| III | $L_3$ | $R_3=+1.0000$ | $d_3=0.0650$ | 1.785 | N,A |
|  |  | $R_3'=+0.5810$ | $s_{34}=0.2700$ | ($\alpha$) |  |
| IV | $L_{4a}$ | $R_{4a}=+1.0000$ | $d_{4a}=0.1550$ | 1.744 |  |
|  |  | $R_{4a}'=-5.5000$ | $s_{4a,b}=0.1053$ |  | A |
|  | $L_{4b}$ | $R_{4b}=-3.4000$ | $d_{4b}=0.1250$ | 1.744 |  |
|  |  | $R_{4b}'=-1.6300$ | $s_{4b,c}=0$ |  |  |
|  | $L_{4c}$ | $R_{4c}=-1.6300$ | $d_{4c}=0.1160$ | 1.640 |  |
|  |  | $R_{4c}'=-1.1460$ | $s_{45}=0.0800$ |  |  |
| V | $L_5$ | $R_5=+1.1460$ | $d_5=0.0780$ | 1.691 |  |
|  |  | $R_5'=+1.3200$ | $s_{56}=CS=0.1260$ |  |  |
| VI | $L_6$ | $R_6=-0.7556$ | $d_6=0.0420$ | 1.847 | N |
|  |  | $R_6'=+2.1873$ | $s_{67}=0.0650$ | ($\gamma$) |  |
| VII | $L_7$ | $R_7=-1.7545$ | $d_7=0.1225$ | 1.713 |  |
|  |  | $R_7'=-0.6594$ | $s_{78}=0.0025$ |  |  |
| VIII | $L_8$ | $R_8=+7.0504$ | $d_8=0.1524$ | 1.744 |  |
|  |  | $R_8'=-1.398065.$ |  |  |  |

30. An objective as defined in claim 25, wherein the components have substantially the characteristics set forth below, linear dimensions being stated with reference to the equivalent focal length of the entire objective, considered as unity;

| Member | Lens | Radii | Thicknesses and Spacings | Glass $n_d$ | Des. |
|---|---|---|---|---|---|
| I | $L_1$ | $R_1=+1.67255$ | $d_1=0.057943$ | 1.60361 | N,B |
|  |  | $R_1'=+0.67067$ | $s_{12}=0.365043$ | ($\beta$) |  |
| II | $L_2$ | $R_2=-1.64866$ | $d_2=0.148721$ | 1.62004 |  |
|  |  | $R_2'=-1.32856$ | $s_{23}=0.042492$ | (x) |  |
| III | $L_3$ | $R_3=+2.13602$ | $d_3=0.049252$ | 1.74400 | N,A |
|  |  | $R_3'=+0.66107$ | $s_{34}=0.303236$ | ($\alpha$) |  |
| IV | $L_{4a}$ | $R_{4a}=+1.22743$ | $d_{4a}=0.083052$ | 1.74400 | A |
|  |  | $R_{4a}'=-66.53817$ | $s_{4a,b}=0.090778$ |  |  |
|  | $L_{4b}$ | $R_{4b}=+1.03274$ | $d_{4b}=0.461615$ | 1.67790 |  |
|  |  | $R_{4b}'=-1.23632$ | $CS=s_{45}=0.094641$ |  |  |

-continued

| Member | Lens | Radii | Thicknesses and Spacings | Glass $n_d$ | Des. |
|---|---|---|---|---|---|
| V | $L_5$ | $R_5=-0.80282$ | $d_5=0.066635$ | 1.48749 | N |
|  |  | $R_5'=+0.99622$ | $s_{56}=0.048286$ |  | ($\gamma$) |
| VI | $L_{6a}$ | $R_{6a}=-8.26213$ | $d_{6a}=0.036697$ | 1.80518 |  |
|  |  | $R_{6a}'=+0.66586$ | $s_{6a,b}=0$ |  |  |
|  | $L_{6b}$ | $R_{6b}=+0.66586$ | $d_{6b}=0.129407$ | 1.51009 |  |
|  |  | $R_{6b}'=-0.75255$ | $s_{67}=0.001931$ |  |  |
| VII | $L_7$ | $R_7=-32.41925$ | $d_7=0.065669$ | 1.67790 |  |
|  |  | $R_7'=-1.42766.$ |  |  |  |

31. An objective as defined in claim 24, wherein the components have substantially the characteristics set forth below, linear dimensions being stated with reference to the equivalent focal length of the entire objective, considered as unity;

| Member | Lens | Radii | Thicknesses and Spacings | Glass $n_d$ | Des. |
|---|---|---|---|---|---|
| I | $L_1$ | $R_1=+1.98647$ | $d_1=0.064579$ | 1.62299 | N,B |
|  |  | $R_1'=+0.79363$ | $s_{12}=0.310662$ |  | ($\beta$) |
| II | $L_2$ | $R_2=-6.94281$ | $d_2=0.286521$ | 1.68893 | Z |
|  |  | $R_2'=-3.53160$ | $s_{23}=0.003880$ |  | (x) |
| III | $L_3$ | $R_3=+0.97595$ | $d_3=0.058213$ | 1.78443 | N,A |
|  |  | $R_3'=+0.57542$ | $s_{34}=0.268147$ |  | ($\alpha$) |
| IV | $L_{4a}$ | $R_{4a}=+1.02113$ | $d_{4a}=0.157717$ | 1.74400 |  |
|  |  | $R_{4a}'=-5.43523$ | $s_{4a,b}=0.118089$ |  | A |
|  | $L_{4b}$ | $R_{4b}=-3.44865$ | $d_{4b}=0.122462$ | 1.74400 |  |
|  |  | $R_{4b}'=-1.62973$ | $s_{4b,c}=0$ |  |  |
|  | $L_{4c}$ | $R_{4c}=-1.62973$ | $d_{4c}=0.178071$ | 1.64250 |  |
|  |  | $R_{4c}'=-1.04242$ | $s_{45}=0.077015$ |  |  |
| V | $L_5$ | $R_5=+1.31310$ | $d_5=0.076984$ | 1.69100 |  |
|  |  | $R_5'=+1.405548$ | $CS=s_{56}=0.126435$ |  |  |
| VI | $L_6$ | $R_6=-0.75532$ | $d_6=0.041384$ | 1.84666 | N |
|  |  | $R_6'=+2.18656$ | $s_{67}=0.063707$ |  | ($\gamma$) |
| VII | $L_7$ | $R_7=-1.75314$ | $d_7=0.122479$ | 1.71300 |  |
|  |  | $R_7'=-0.65890$ | $s_{78}=0.002217$ |  |  |
| VIII | $L_8$ | $R_8=+7.04544$ | $d_8=0.154131$ | 1.74400 |  |
|  |  | $R_8'=-1.39672.$ |  |  |  |

* * * * *